(12) United States Patent
Kaiser et al.

(10) Patent No.: US 9,396,090 B2
(45) Date of Patent: Jul. 19, 2016

(54) SYSTEM OVERVIEW DIAGRAM GENERATOR

(75) Inventors: Martin Kaiser, Mannheim (DE); Andreas Meier, Heidelberg (DE)

(73) Assignee: SAP SE, Walldorf (DE)

( * ) Notice: Subject to any disclaimer, the term of this patent is extended or adjusted under 35 U.S.C. 154(b) by 454 days.

(21) Appl. No.: 12/979,923

(22) Filed: Dec. 28, 2010

(65) Prior Publication Data
US 2012/0167013 A1    Jun. 28, 2012

(51) Int. Cl.
*G06F 15/177* (2006.01)
*G06F 11/36* (2006.01)
*H04L 12/24* (2006.01)

(52) U.S. Cl.
CPC .......... *G06F 11/3664* (2013.01); *H04L 41/044* (2013.01); *H04L 41/22* (2013.01)

(58) Field of Classification Search
CPC ... H04L 41/22; H04L 12/2602; H04L 41/044; H04L 41/12
USPC ................... 715/846, 853, 734–738
See application file for complete search history.

(56) References Cited

U.S. PATENT DOCUMENTS

| | | | | |
|---|---|---|---|---|
| 6,330,225 B1* | 12/2001 | Weber et al. | ................... | 370/231 |
| 6,774,899 B1* | 8/2004 | Ryall et al. | .................... | 345/440 |
| 8,181,182 B1* | 5/2012 | Martin | ........... | 718/104 |
| 2006/0143614 A1* | 6/2006 | Lier et al. | ...................... | 718/100 |
| 2007/0268294 A1* | 11/2007 | Eagen et al. | ................... | 345/474 |
| 2008/0162490 A1* | 7/2008 | Becker et al. | .................. | 707/10 |
| 2008/0319719 A1* | 12/2008 | Grose et al. | ...................... | 703/2 |
| 2011/0131549 A1* | 6/2011 | Bozak et al. | .................. | 717/121 |
| 2011/0158242 A1* | 6/2011 | Auer et al. | .................... | 370/400 |
| 2012/0096425 A1* | 4/2012 | Gupta et al. | ................. | 717/101 |

* cited by examiner

*Primary Examiner* — Steven Sax
*Assistant Examiner* — Christopher J Fibbi
(74) *Attorney, Agent, or Firm* — Mintz Levin Cohn Ferris Glovsky and Popeo, P.C.

(57) ABSTRACT

Disclosed are methods, systems and products, including a method that includes receiving, by at least one processor-based device, data relating to features of a computing system, generating, by the at least one processor-based device, a diagram including graphical data representative of, at least partly, the features of the computing system, including an order of release of at least some subsystems of the computing system and layered relationship information, and providing the generated diagram to a user interface for presentation.

20 Claims, 25 Drawing Sheets

| FIG. 2A-1 | FIG. 2A-2 | FIG. 2A-3 | FIG. 2A-4 | FIG. 2A-5 |
| FIG. 2A-6 | FIG. 2A-7 | FIG. 2A-8 | FIG. 2A-9 | FIG. 2A-10 |
| FIG. 2A-11 | FIG. 2A-12 | FIG. 2A-13 | FIG. 2A-14 | FIG. 2A-15 |
| FIG. 2A-16 | FIG. 2A-17 | FIG. 2A-18 | FIG. 2A-19 | FIG. 2A-20 |

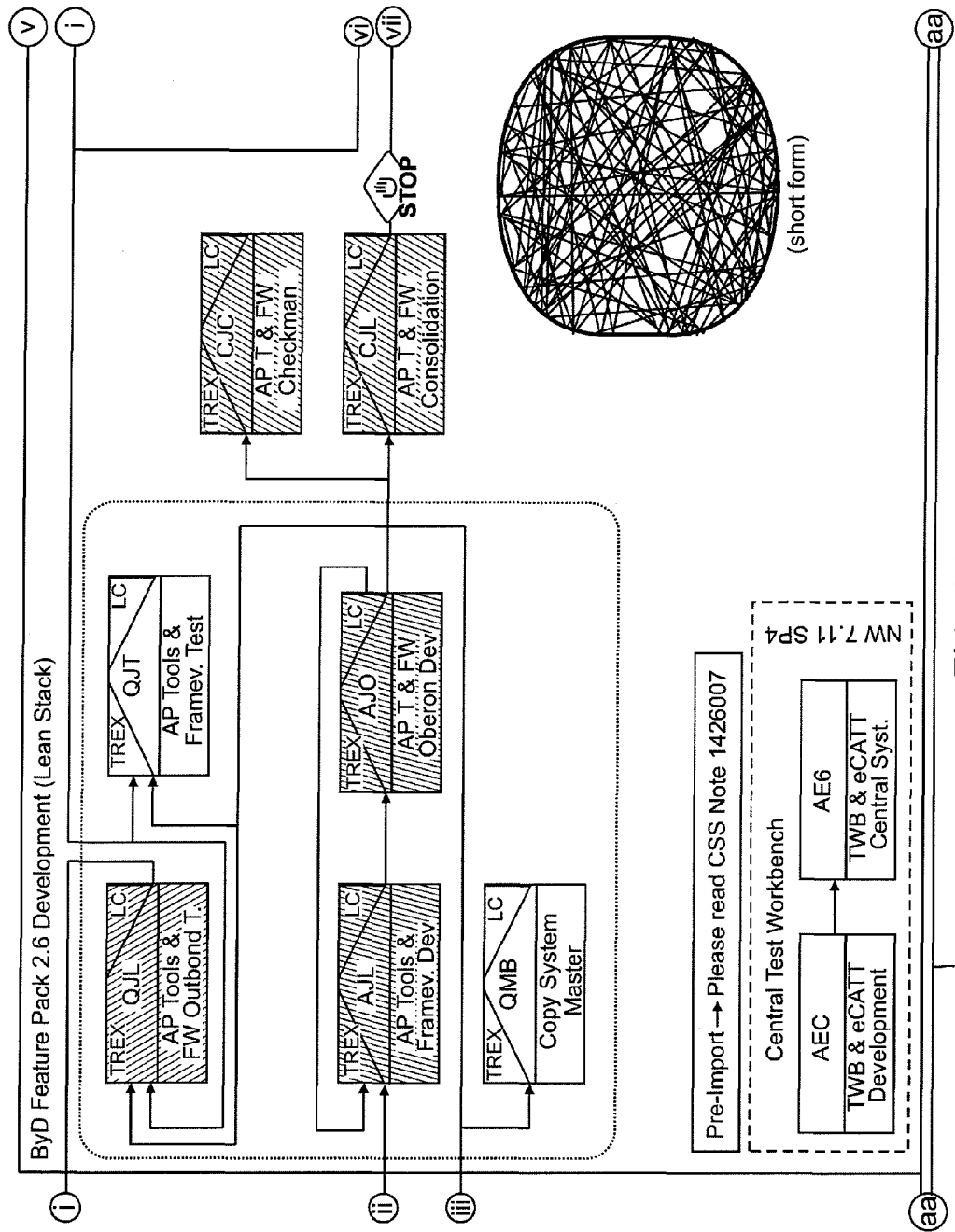

SYSTEM OVERVIEW DIAGRAM GENERATOR

BACKGROUND

The present disclosure relates to system representation, and more particularly to generating system diagrams, such as landscape diagram overviews.

Various tools and applications are available to provide a user with at least partial representation of features of a computing system. For example, some tools and applications may be used to illustrate which system ships software to which other. Other tools and applications may be used to display system lifecycle for a certain system or groups of systems. Additionally, various tools and applications may be used to illustrate layers and software components. However, such tools and applications generally do not provide a single comprehensive overview of multiple features of a system.

SUMMARY

In one aspect, a method is disclosed. The method includes receiving, by at least one processor-based device, data relating to features of a computing system, generating, by the at least one processor-based device, a diagram including graphical data representative of, at least partly, the features of the computing system, including an order of release of at least some subsystems of the computing system and layered relationship information, and providing the generated diagram to a user interface for presentation.

Embodiments of the method may include any of the features described in the present disclosure, including any of the following features.

The diagram may include a graphical arrangement of blocks in which vertical positioning of a block in the arrangement of blocks represents of the order of release of a subsystem represented by the block, and horizontal positioning of the block in the arrangement of blocks represents the layered relationship of the subsystem represented by the block relative to another subsystem represented by another block.

The diagram may further include data representative of data flow for at least one of the subsystems of the computing system.

The data representative of the data flow may include graphical representation of data flow between components of the at least one of the subsystems of the computing system.

The diagram may further include at least one of, for example, text-based data, color-based data, and/or pattern-based data, representative of at least one of, for example, developmental status for at least one of the subsystems of the computing system, usage for the at least one of the subsystems of the computing system, and/or number of installed layers.

At least some processing components of at least one of the subsystems of the computing system may be represented as a square icons, with each of the square icons including at least one of, for example, color-based information representative of data processing equipment type for an associated data processing component, color based information representative of the developmental status of the associated data processing component, a component name of the associated data processing component, a description of the associated data processing component, structure information for the associated data processing component, and/or information regarding the use for the associated data processing component.

Receiving the data relating to the features of the computing system may include receiving data from a landscape directory maintaining landscape data for multiple tenants with access to the computing system.

In another aspect, a system is disclosed. The system includes at least one processor-based device, and at least one non-transitory memory storage device in communication with the at least one processor-based device. The at least one memory storage device stores computer instructions that, when executed on the at least one processor-based device, cause the at least one processor-based device to receive data relating to features of a computing system, generate a diagram including graphical data representative of, at least partly, the features of the computing system including an order of release of at least some subsystems of the computing system, and layered relationship information, and provide the generated diagram to a user interface for presentation.

Embodiments of the system may include any of the features described in the present disclosure, including any of the features described above in relation to the method, and the features described below.

In a further aspect, a computer program product is disclosed. The computer program product includes at least one non-transitory computer readable storage device storing computer instructions that, when executed on at least one processor-based device, cause the at least one processor-based device to perform operations including receiving data relating to features of a computing system, generating a diagram including graphical data representative of, at least partly, the features of the computing system including an order of release of at least some subsystems of the computing system, and layered relationship information, and providing the generated diagram to a user interface for presentation.

Embodiments of the computer program product may include any of the features described in the present disclosure, including any of the features described above in relation to the method and the system, and the features described below.

Details of one or more implementations are set forth in the accompanying drawings and in the description below. Further features, aspects, and advantages will become apparent from the description, the drawings, and the claims.

BRIEF DESCRIPTION OF THE DRAWINGS

FIG. 2A is a table illustrating assembly of an example landscape diagram with graphical data representative of features of a computing system, consistent with FIG. 2A-1-2A-20.

FIG. 3 is a flowchart of an example procedure to receive data relating to a system features and to generate a diagram based on the received data.

FIG. 4 is a schematic diagram of an example computing device that may be used in the implementation of any one of the various depicted systems/components/devices of FIG. 1.

Like reference numbers and designations in the various drawings indicate like elements.

DETAILED DESCRIPTION

Figure 1A:
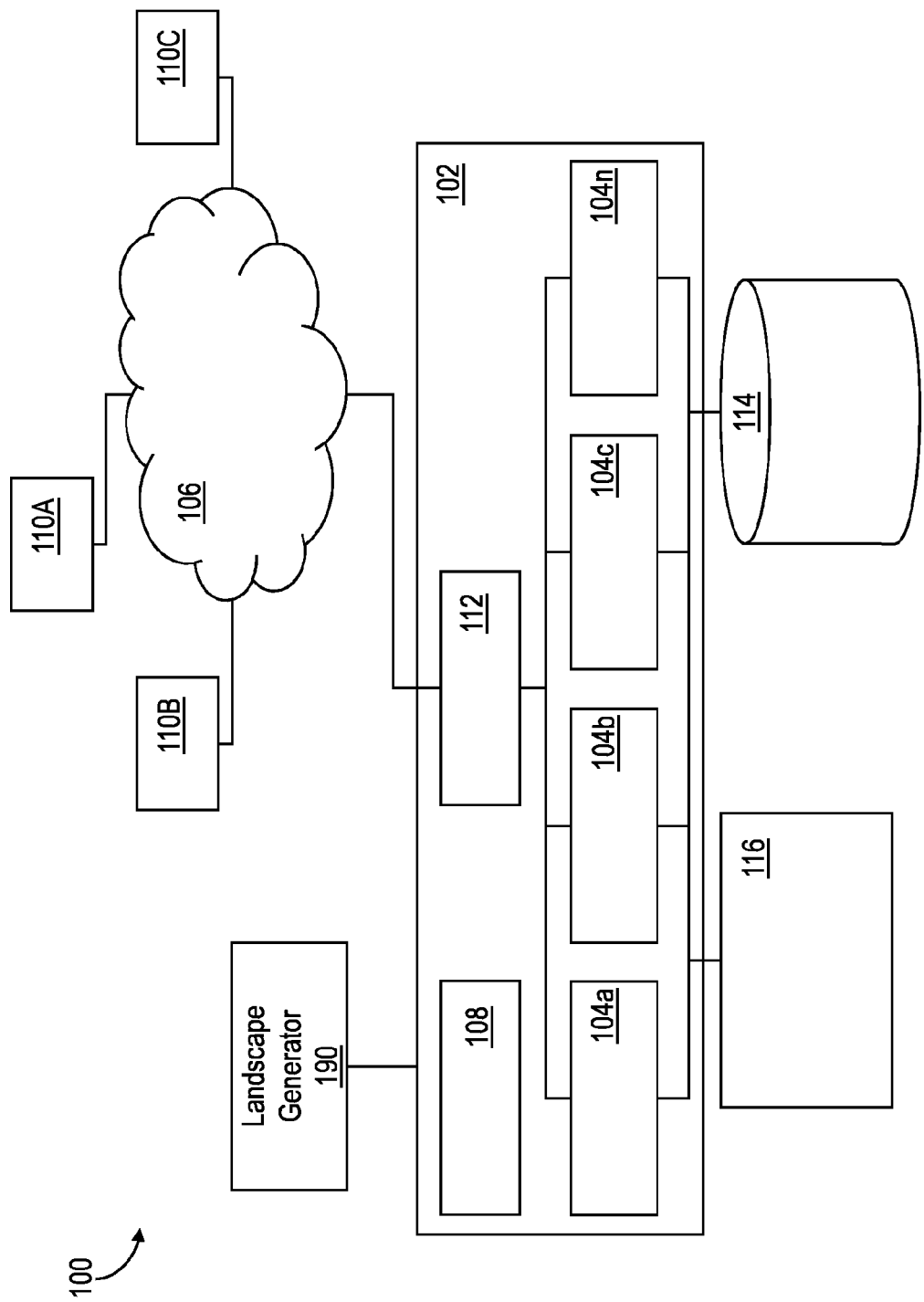
FIGS. 1A-B are schematic diagrams of a computing system used to receive data relating to system features and to generate diagram to present that data.

Described herein are methods, systems, apparatus and computer program products, including a method that includes receiving, by at least one processor-based device, data relating to features of a computing system, and generating, by the at least one processor-based device, a diagram (e.g., a landscape diagram) including graphical data representative of, at least partly, the features of the computing system. The graphical data includes data representative of an order of release of at least some of subsystems of the computing system, and layered relationship information, such as layer relationships between various of the subsystems of the computing system. In some implementations, the landscape diagram includes a graphical arrangement of blocks in which vertical positioning (e.g., along an y-axis) of a block in the arrangement of blocks represents order of release of a subsystem represented by the block, and horizontal positioning (e.g., along an x-axis) of the block in the arrangement of blocks represents the layered relationship of the subsystem represented by the block relative to another subsystem represented by another block.

Implementations of the systems, apparatus methods, and products described herein enable abstraction of a complex data processing system/network in a logically meaningful manner, to provide a graphical representation of features of such a data processing system/network, including the configuration of the network, e.g., a graphical depiction of the configuration of individual subsystems comprising the network represented, the subsystems versions and/or date of release, data flow within the individual subsystems, etc. The graphical representation of the system/network may be generated using commercially available graphics applications, such as Microsoft's Visio™, or by a specially developed application configured generate an abstraction (such as graphical representation) based on collected data, and/or represent data flow information. In some embodiments, such a specially developed application may also be configured to collect the data pertaining to the system (and its individual subsystems) from which an abstraction and/or system representation can be generated.

In some implementations, data regarding system features is collected and/or extracted from, for example, large integrated business systems (e.g., such as SAP's Transport Management System which is used to consolidate orders and optimize shipments), from import buffer of the assigned systems, and/or from central server administration tools. In some embodiments, the data collected from the system whose graphical representation is to be generated may be supplemented with additional information, such as the logical layer of the system and release dates.

After obtaining the data representative of a system's features, a tool (e.g., application) configured to generate a representation of the system and/or the system's subsystems is used to process the data obtained to compile a representation (which may include graphical and text-based data) of the features of the system being represented, including features depicting the configuration of the system (e.g., the interconnected and data flows of individual subsystem constituents of the system), order of release of individual subsystems of the system represented, layered relationship of the subsystems, etc. In some implementations, the systems' features pertaining to the order of release may be represented, in the generated landscape diagram, according to, for example, the vertical positioning of the representations of subsystems (e.g., blocks corresponding to respective subsystems of the system), while features pertaining to layered relationship, as well as data flow representations, between individual subsystems (and/or components of the subsystem) may be represented by the horizontal positioning of the blocks in the diagram. Thus, for example, in a generated diagram, rendering of data along the X-axis (e.g., from left to right) may correspond to flow-driven representation, whereas rendering of data along the y-axis, e.g., from bottom to top, may correspond to version (release)-based representation of subsystems (for example, in historical descending order, with the latest version in the upper range).

The generated diagram may further include representations for other features of the system. For example, in some embodiments, color codes, shading levels, fill-patterns, and/or text-based data may be used to represent features such as status of the system/subsystem/component, usage type of the system/subsystem/component, number of software layers installed in the system, etc. For example, to represent the status (e.g., "released for public use," "in disassembly," etc.) of a system/subsystem/component, a particular shading/fill-pattern for that system/subsystem/component may be used. Additionally and/or alternatively, color codes and/or text-based data may be used as well. Similar color codes/shadings/patterns/texts conventions may be used to represent a usage type feature (e.g., "Testsystem," "Special project system," "Sandbox," "Development," etc.), and the "fill state" feature of the system (e.g., how many software layers are installed in the system, for example, "full stack," "NetWeaver only," etc.)

In some implementations, the diagram may be generated using a commercial graphics application or a proprietary custom-developed application to generate system diagrams, such as those described herein, may be used.

In some implementations, each data processing component (e.g., of a subsystem) may be represented as a square icon/symbol. Each of these symbols may contain information about the type of data processing equipment (e.g., represented using a color code), a unique name, description, and additional information describing the structure of the data processing system in more detail. Color codes may show both the state of a data processing component in its life cycle ("under construction," "ready for use," "marked for degradation"), and its usage purpose (development, testing, consolidation, etc.)

The data flow between subsystems and/or components may be represented by a direction arrow display. Where the overall presentation has a left to right orientation, (i.e., along the x-axis) the arrangement of arrows is similar to the symbols of the data processing equipment (e.g., left=input, right=output). Rear arrows may also follow this pattern. Special positions of some data flow connections may be represented by stop marks and written comments.

In some implementations, some subsystems and/or their individual modules may be logically related units that may be represented using framing. For example, in some implementations, subsystems or their modules shown in the diagram (a diagram such as FIG. 2A, and the diagram 290 of FIG. 2B, discussed in greater detail below) are used to build/implement a larger (e.g., integrated) application, where within this larger application there may be several groups with specialized functions. To more clearly represent these groups/units, frames may be are used. For example, as illustrated in FIG. 2B, showing the example diagram 290 (which may be a magnified part of a larger diagram), modules 294 and 296, identified as CM0 and QT0 of the subsystem 292 are enclosed within a dashed frame 299 that identifies the two modules as part of a unit of 298 of the subsystem 292. Such a marked unit may have a specialize role or function within the subsystem 292. Similarly, in some embodiments, subsystems may be grouped together (e.g., using dashed frames, or other types of frames) to represent a unit or a group of subsystems that may have a specialized role or function.

The bound version representations will be supported in addition to spatially separate arrangements by additional information for each release.

The systems, apparatus, methods and products described herein enable the presentation of complex system operation, configuration, and/or other features, in a consistent, easy-to-understand and meaningful manner, and with reduced costs for generating such a presentation.

Thus, to generate a diagram (also referred to herein as a "landscape diagram"), a diagram generating application or tool receives data (for example, by querying individual system modules, including the system's subsystems and components thereof, or by querying one or more data repositories storing data representative of such system information) relating to features of a system. The diagram generating application is configured to subsequently generate based, at least in part, on the data received the system diagram to provide a comprehensive and easy-to-understand abstraction of the system in question and its features.

FIG. 1A shows a block diagram of a system 100 based on a multi-tenant implementation of a software delivery architecture. Briefly, the system 100 includes an application server 102, which can, in some implementations, include multiple server systems 104a-n that are accessible over a network 106 from client machines operated by users at each of multiple organizations 110A-110C (referred to herein as "tenants" of a multi-tenant system and/or as "clients") supported by the system 100. Additional or fewer clients may be in communication with the server 102 via the network 106. Each of the clients 110A-C may constitute at least part of a local server serving at least one of a plurality of entities. Such entities can include different companies that may or may not be related to one another, or may include any type of user that can access any one of the servers 104a-n. The one or more clients 110A-C are configured to enable users to provide input and receive data (displayable, for example, via local interfaces coupled to the respective clients 110A-C). The one or more clients 110A-C communicate with the one or more application servers 104a-n via, for example, direct wire-based links, network communication links, wireless communication links, etc.

For a system in which the application server 102 includes multiple server systems 104, the application server can include, in some embodiments, a load balancer 112 to distribute requests and actions from users at the one or more clients 110A-110C to the one or more server systems 104. A user can access the software delivery architecture across the network using a thin client, such as for example a web browser or the like, or other portal software running on a client machine. The application server 102 can access data and data objects stored in one or more data repositories 114. The application server 102 can also serve as a middleware component via which access is provided to one or more external software components 116 that can be provided by third party developers.

The servers of the application server 102 may each be executing a set of services (also referred to as "application services") that process/serve users' requests. For example, a user, interacting with the application server 102 through, for example, one of the interfaces of the clients 110A-C, can submit a request for service by one or more of the applications on the one or more servers of the application server 102, that cause one or more instances of the applications required to serve the request to be invoked. In some embodiments, the application server system 102 may include systems/components/modules, such as, for example, a message server (not shown in FIG. 1) to enable communication between the individual servers and/or between the application server 102 and other application servers (e.g., transmitting requests and data from one application server to another and responding to requests for information to enable generation of a landscape directory). In some implementations, a message server may monitor and manage information about the application servers and/or their respective servers, e.g., information such as current request loads and data traffic supported by the various servers.

To provide for customization of the core software platform for each of multiple organizations/entities supported by the system 100, the data and data objects stored in the repository or repositories 114 that are accessed by the application server 102. In some embodiments, the repository 114 may be implemented using, for example, a database system that generally includes a data management application (which may be executing locally or remotely) and one or more data storage devices (i.e., memory devices, which may be distributed over a network), in which data relating to the objects to be managed is maintained. The data management application may be a commercial or customized data management system, e.g., a database management application implemented in software and executing on processor-based servers. Microsoft SQL server is an example of a commercially available database management application. The database system may also include a communications module to enable it to communicate with remote devices (e.g., wirelessly, through a network gateway connection, or through wired links). In some implementations, a database interface may include a buffer, or cache, to store frequently accessed data in the local memory of the application server.

Figure 1B:
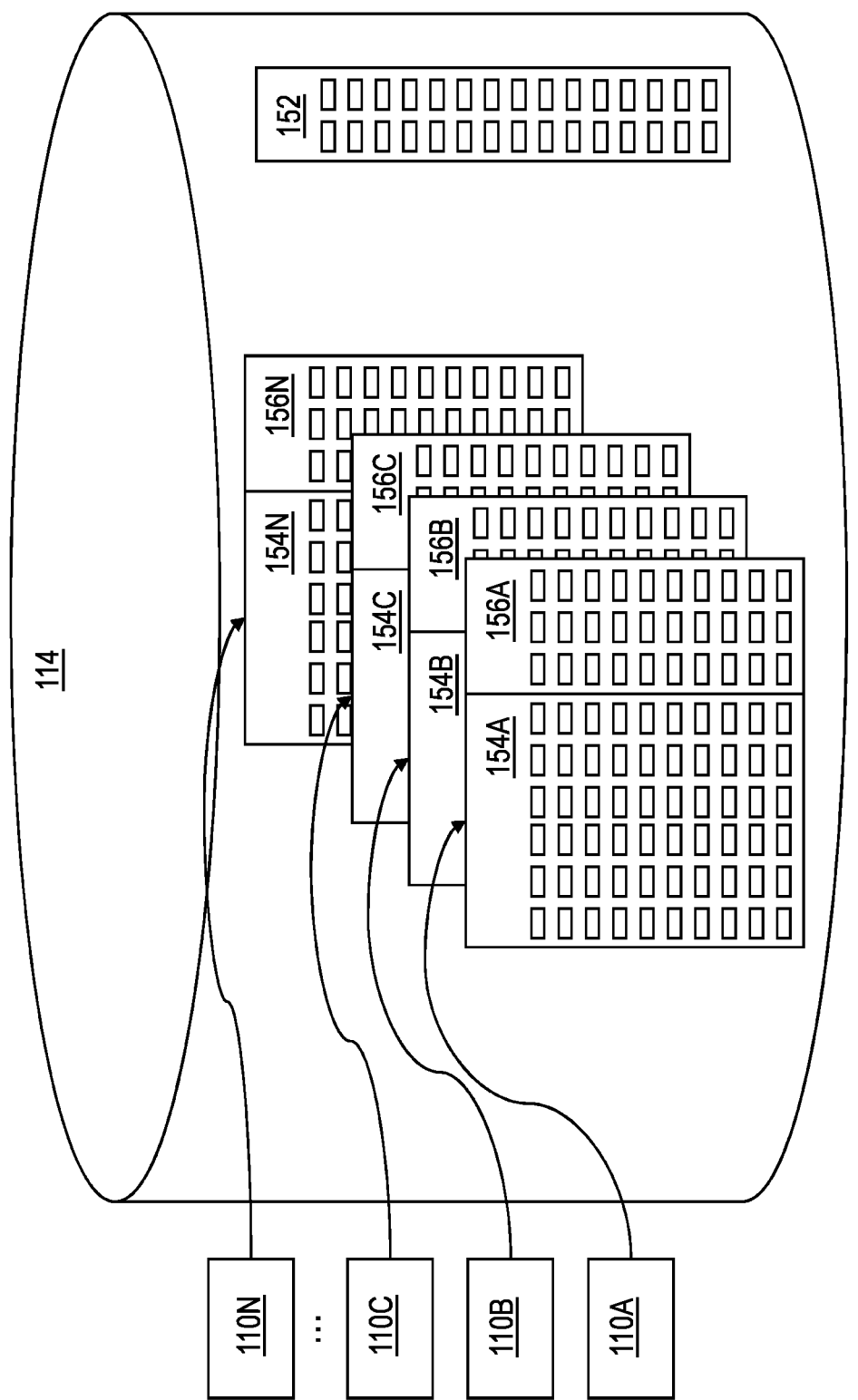

Data stored in the repository 114 may include, in some embodiments, three types of content as shown in FIG. 1B: core software platform content 152, system content 154, and tenant content 156. Core software platform content 152 includes content that represents core functionality and is not modifiable by a tenant. System content 154 can in some examples be created by the runtime of the core software platform and can include core data objects that are modifiable with data provided by each tenant. For example, if the core software platform is a business systems, such as an enterprise resource planning (ERP) system that includes inventory tracking functionality, the system content 154A-154N can include data objects for labeling and quantifying inventory. The data retained in these data objects may be tenant-specific: for example, each tenant (e.g., a client) 110A-110C stores information about its own inventory, which might be kept private (i.e., inaccessible to other clients unless authorized by the tenant). Tenant content 156A-156N includes data objects or extensions to other data objects that are customized for one specific tenant 110A-110C to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 156 can include condition records in generated condition tables, access sequences, price calculation results, or any other tenant-specific values. A combination of the software platform content 152 and system content 154 and tenant content 156 of a specific tenant are presented to users from that tenant such that each tenant is provided access to a customized solution whose data are available only to users from that tenant.

A multi-tenant system such as that described herein may include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 102 that includes multiple server systems 104a-n that handle processing loads distributed by a load balancer 112. Potential benefits from such an arrangement can include, but are not limited to, high and reliably continuous application server availability and minimization of unplanned downtime, phased updating of the multiple server systems 104 to permit continuous availability (one server system 104 can be taken offline while the other systems continue to provide services via the load balancer 112), scalability via addition or removal of a server system 104 that is accessed via the load balancer 112, and de-coupled lifecycle processes (such as for example system maintenance, software upgrades, etc.) that enable updating of the core software independently of tenant-specific customizations implemented by individual tenants.

In some embodiments, at least some of the clients 110A-C and/or the servers 104a-n of the application server 102 may be implemented based on a cloud-based system, such as SAP's By Design system. A cloud-based system generally enables a user at, for example, the client 110A to access core/central system resources on-demand. These core/central resources comprise business software-based systems hosted at a remote location in the cloud, e.g., accessed via the Internet. The cloud-based system may include a heterogeneous system of different subsystems providing a management system for managing financials, customer relationships, human resources, projects, procurement, and/or a supply chain. The cloud-based system may include a "central component(s)" located remotely in the so-called cloud. These central components are shared, for example, by tenants, such as ABAP (Advanced Business Application Programming) client applications. For example, the clients 110A-B may be located at one or more user locations, but the application server 102 including the repository 114 may be accessed as a service on-demand via a cloud. Although ByDesign and cloud based software-as-a-service systems are noted herein, the subject matter described herein may be used in other systems as well.

Implemented on the computing system 100 is an application labeled as landscape generator 190, although it may be located in other locations as well. The landscape generator 190 may be configured to collect/receive data relating to features of a computing system (which may be the computing system 100, a portion of the system 100, or some other computing system), and further configured to generate a diagram, based on the collected/received data, representative of the features of the system with respect to which the data was collected/received.

Figures 2, 2A, 3, 4, 5, 6, 7, 8, 9, 10, 11, 12, 13, 14, 15, 16, 17, 18, 19, 20:
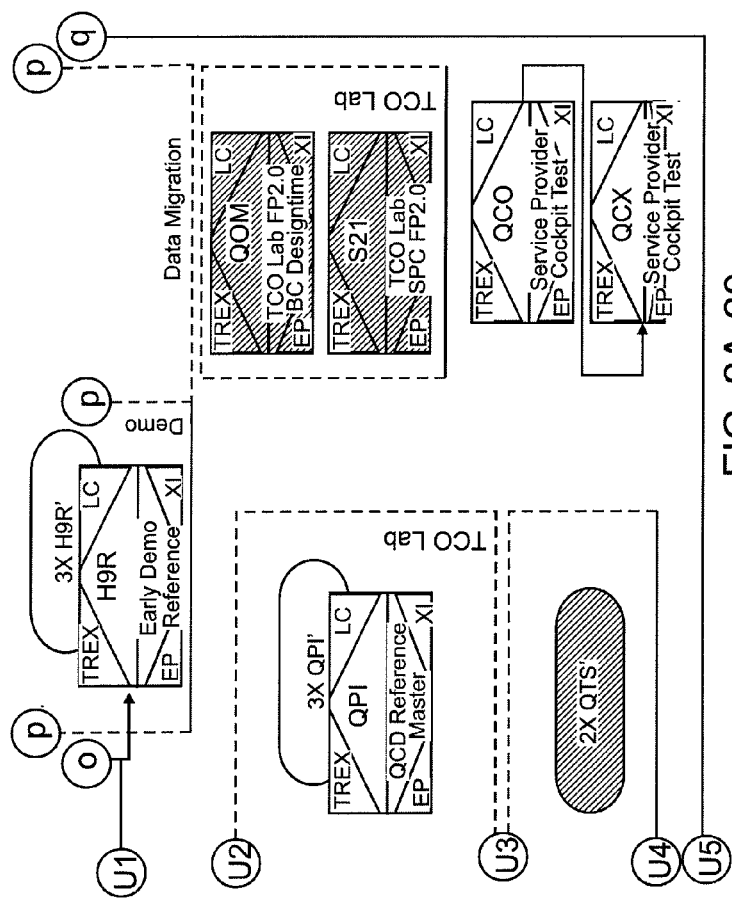
FIGS. 2A-1-2A-20 are a portions of an example landscape diagram with graphical data representative of features of a computing system.

With reference to FIG. 2A an example diagram (represented as an assembled diagram of FIGS. 2A-1-2A-20) of a computing system is shown. As described herein, element numbers referencing FIG. 2A can be found in FIGS. 2A-1-2A-20. The system that is to be represented generally includes one or more subsystems (e.g., software and/or hardware applications, such as service applications), each of which may comprise one or more individual components (also referred to as processing components). Some of the subsystem constituents of the system to be represented by a diagram may be in communication with each other and thus interact in some manner. For example, data processed by one subsystem may be forwarded for further processing to another subsystem. As another example, one subsystem of the particular system being represented may be a data management application to manage data and/or data records stored in a data repository. The diagram 200 shown in FIG. 2A provides a representation of several subsystems of the particular system, which include subsystems 202-224. Each such subsystem may be an application, a system comprising several applications, or may otherwise represent any abstraction of a computing arrangement at any hierarchical level of system or network arrangement. Each of the subsystems represented in the diagram may provide a representation of at least some of the individual processing components (e.g., modules constituting an application). For example, the subsystem 202 comprises processing components 230-251. The area of the diagram depicting the subsystem 202 provides a graphical representation of the configuration/arrangement of the components constituting that subsystem, including data flow between various individual components of the subsystem. The example diagram 290 of FIG. 2B provides another example landscape representation of a system, including at least some of the system's subsystems (and their components), the interrelationships between the subsystems and/or the components, etc.

The landscape diagrams described herein, including, for example, FIG. 2A, include graphical representations of at least some of the features of the system in question, including, for example, a graphical representation of an order of release of at least some of the subsystems constituting the system and layered relationship information, e.g., layered relationships between various subsystems of the computing system. More particularly, in some implementations, the vertical positioning of subsystem representations (e.g., the respective blocks representative of the subsystems) may be used to represent the order of release, and can thus provide a representation of the development history (or evolution) of the subsystems. In the example of FIG. 2A, the subsystem 220, identified as NGAP 1/NW 8.0 (i.e., release 8.0 of the NetWeaver application, which is a platform that provides development and runtime environment for SAP applications and can be used for custom development and integration with other applications and systems), is positioned at a higher vertical position than the block representing the subsystem 208, which is identified as NW 7.2L (i.e., NetWeaver release 7.2L), indicating that the components (and other represented features, including the inter-component configuration of the subsystem 222) were released (or rolled-out) subsequent to the subsystem components, and other features, depicted in the block representing the subsystem 208. Similarly, the subsystem 208 depicting at least part of the subsystem features for NetWeaver, Release 7.2L, is located at a higher vertical positioning in FIG. 2A than the block 202 which depicts features corresponding to NetWeaver, Release 7.11. Thus, the vertical positioning of blocks provide an easy visual tool for a user to identify the order of release of various aspects of the subsystems depicted in the diagram.

In some implementation, the representation of the order of release of one or more subsystems may be used to indicate the constituents/components of the subsystems (and their configuration) at various release date. That is, in some embodiments, instead of representing the entire subsystem in a single block, the subsystem configuration may be divided into several blocks that each corresponds to a different release date for that subsystem. Under such circumstances, a portion of the subsystem released at a particular date will occupy a different block (in the landscape diagram) than portions of the subsystem released at different dates. Such a representation enable breaking the subsystem representation into more manageable multiple blocks that also convey to the user important information on the evolution of the subsystem in question (e.g., when was a particular functionality of the subsystem, implemented using the components depicted in a block, released).

Another feature that may be represented in a diagram, such as FIG. 2A, is the layered relationship between various subsystems, including, for example, data flows between the subsystem, hierarchical relationships between the subsystems constituting the layers of the system represented by the diagram, etc. In some implementations, system layer information is provided, for example, through the horizontal positioning of the subsystem representations (e.g., blocks) in the diagram. In FIG. 2A, the layered relationship between blocks 212 and 216 can be represented by the horizontal positioning of the blocks. In the embodiments of FIG. 2A, blocks located farther along the horizontal axis (the x-axis) indicate that their corresponding subsystems are at a higher layered relationship compared to blocks that are closer to the origin of the horizontal axis (i.e., farther to the left). For example, as shown in FIG. 2A, the subsystem depicted in block 212 provides input to the subsystem of block 216 (labeled VLab FP2.6), which is located farther along the horizontal axis than does block 212, thus indicating that the subsystem of block 216 is at a higher layered relationship compared to the subsystem represented by Block 212. Accordingly, FIG. 2A provides an easy-to-understand visual tool to identify the layered relationship of the subsystems depicted in the diagram.

Features of the system relating to data flows of individual components (e.g., modules) of the subsystem may also be represented. As illustrated, the configuration of the subsystem 212 includes data flows between individual components of the subsystem 212. For example, the processing component 260 of the subsystem 212 is in communication with the components 262, 264, and 266, and provides them with data and/or instructions/commands. Processing block 264, in turn, is also in communication with processing blocks 268 and provides that block with input (e.g., data and/or instructions/commands). The input/output flows of the subsystem 222, as well as other subsystems depicted in FIG. 2A, thus provides an easy-to-understand representation of interrelations of the various components of the subsystems (e.g., configuration and data flows), as well as the interrelationships between the subsystems themselves. FIG. 2A illustrates the data flow information using directional arrows (e.g., an arrow going into a particular component or into a subsystem represents input into that subsystem, and similarly, directional arrows flowing out of components and subsystems represent output flows). Other ways to represent communication paths and flows within the system are also possible.

In some implementations, the generated system diagram may include additional information representative of further features of the system, its subsystems, and/or the subsystems' components. For example, and as shown in FIG. 2A, may include text-based data representative of at least one of, for example, identity of the system/subsystems/components (e.g., their names or codes identifying the various parts of the system), developmental status for at least one of the subsystems, usage for at least one of the subsystems of the computing system, number of installed layers, etc. Information regarding the above features (identity, status, etc.) may also be provided through color codes, fill-patterns used to fill the various objects appearing in the diagram, the particular shape of the objects, etc. For example, as shown, FIG. 2A includes, with respect to the subsystem 220, the subsystem identity (which may be an abbreviation, acronym or code) of "NGAP 1.0/NW 8.0 Landscape," as well as release number (as noted above, order of release information is also conveyed by the relative vertical positioning of subsystems' blocks relative to other blocks). Text-based data may also be used to annotate the diagram and provide additional useful information. For example, the subsystem 211 (appearing within the subsystem 210) includes the annotations "Productization and Validation" and "Special System" to provide some information about the role and nature of the subsystem depicted in the block.

Color-code data, fill-pattern data, and pre-defined geometrical shapes may be used to further represent data regarding features of a computing system, its subsystems, and of the subsystems' components. As shown, FIG. 2A-16 includes a legend 270 defining various shapes, color, and/or fill-patterns representative of various aspects/features of the system represented by FIG. 2A. For example, the legend 270 defines the square-shaped symbol 272 with its associated illustrated fill-pattern (and which may also include a pre-defined color) as being representative of development/correction components. Thus, components appearing in FIG. 2A that have the geometric shape (square) and fill pattern of the symbol 272 correspond to components/modules/subsystems that, for example, are under development. In the example of FIG. 2A, the component 235 in the subsystem 202 (identified as "X9M") and component 282 in the subsystem 212 (identified as "HCC") are two components that are indicated to be under development. As another example, the legend also includes the square-shaped symbol code 274 having a dark fill-in pattern, that corresponds to components (e.g., modules) that are planned for disassembly (e.g., to be discontinued). In the example of FIG. 2A, the component 236 in the subsystem 202 (identifies as "C2F") and the component 237 in the subsystem 202 (identified as "C2M") are two components that are represented, using easy-to-understand graphical/visual representation, as components that have been designated to be disassembled at some point in the future.

Additional representations based on pre-defined color, pre-defined fill-patterns, and pre-defined geometric shapes include symbol codes 276a-m shown in the legend 270, which include, respectively, a symbol code 276a to represent an add-in component (represented as a blank right-angle triangle), symbols codes to represent active or partly active components (symbols 276b-c), a symbol 276d to represent a separately installed system or component, a symbol code 276e to represent a clone of a separately installed system or component, a symbol code 276f to represent a main system test, a symbol code 276g to represent a consolidation system (or component), a symbol code 276h to represent subsystems/systems set up in a customer like way (such systems are sometimes referred to as "TCO Lab," or "Systems of Verification lab"; these systems may also be represented with a special color to indicate that these systems are separated on a network level from a development network), a symbol code 276i to represent that the corresponding system/subsystem/component is not yet available, a symbol code 276j to, in some embodiments, represent a link to a separate landscape, and in some embodiments, to represent a system with special focus (e.g., like the frame 299 of FIG. 2B), a symbol code 276k that, in some embodiments, indicates that a web dispatcher is available (in some implementations, SAP's Web-Dispatcher may be used to access all the systems and thus the symbol 276k may not be needed), a symbol code 276l (e.g., an ellipse) indicating that the corresponding system/subsystem/component has moved, and an arrow symbol code 276m representative of a transport route (e.g., to represent data flow paths. Fewer or additional symbol codes, each represented by a pre-defined color(s), a pre-defined geometric shape, and/or a pre-defined fill-pattern, may be used in conjunction with the legend 270, and by extension, in conjunction with the landscape diagram (such as FIG. 2A).

Thus, in some embodiments, at least some processing components of at least one of the subsystems of the computing system are represented as a square icons, with each of the square icons including at least one of, for example, color-based information representative of data processing equipment type for an associated data processing component, color based information representative of the developmental status of the associated data processing component, a component name of the associated data processing component, a description of the associated data processing component, structure information for the associated data processing component, and information regarding the use/purpose for the associated data processing component.

Additionally, features of a given computing system, or of multiple inter-connected, computing systems, may be represented using other types of representation schemes.

With reference to FIG. 3, a flowchart of an example procedure 300 to generate a diagram representing features of a computing system is shown. To generate such a diagram, data relating to features of the system is received (retrieved) 310 at, for example, an application configured to generate a landscape diagram representative of such received data. The data from which data can be used may be collected automatically by, for example, having a data collection application, such as landscape generator 190 shown in FIG. 1A, query data repositories holding configuration information in relation to the system(s) whose features are to be represented. For example, in some implementations, queries may be sent to an interface used to access and manage configuration data, including landscape data, maintained for various systems (e.g., systems implemented using the computing system 100.

In some embodiments, system configuration and/or landscape data may be maintained, at least in part, in a landscape directory (which may be stored, in some embodiments, at a data repository (e.g., such as the data repository 114 shown in FIG. 1A) of the computing system 100). Such landscape data may be arranged in data records that are stored in clients' (tenants) individual landscapes. Further details regarding implementations and use of landscape directories, including landscape directories to manage systems implemented using cloud computing, are provided, for example, in U.S. application Ser. No. 12/953,300, entitled "Cloud-Processing Management With A Landscape Directory," the content of which is hereby incorporated by reference in its entirety. Briefly, a landscape directory may be used to enable automatic connection of pre-defined and pre-developed components (e.g., components that include other applications and tools) of systems/subsystems, including customer-specific systems, on-demand systems, etc. Such system management functionality may be implemented, at least in part, through use of a bundle of interfaces to provide clients access to the clients' shared and private landscape data in the landscape directory.

Landscape data at a landscape directory may also include data that defines the connectivity between various applications, and may define separate connectivity configurations for the various clients/tenants that use identified applications. A landscape directory may also be used to maintain access data pertaining to the accessibility of applications to be used by the various clients, and may include, for example, status and availability information for the various applications, e.g., whether service applications are active, information as to whether downtime is scheduled for any application, lifecycle status information (e.g., for a particular application, whether the application has been released, is obsolete, has been replaced by another application, etc.), and other such information. The data recorded in a landscape directory may thus be used to automatically determine, for example, communications paths and links between interacting subsystems (applications) identified in a particular landscape. Thus, in some embodiment, the data based on which diagrams may be generated may be received/collected from a landscape directory maintaining landscape data for multiple tenants with access to a computing system (such as the computing system 100 of FIG. 1).

Figures 1, 2A:
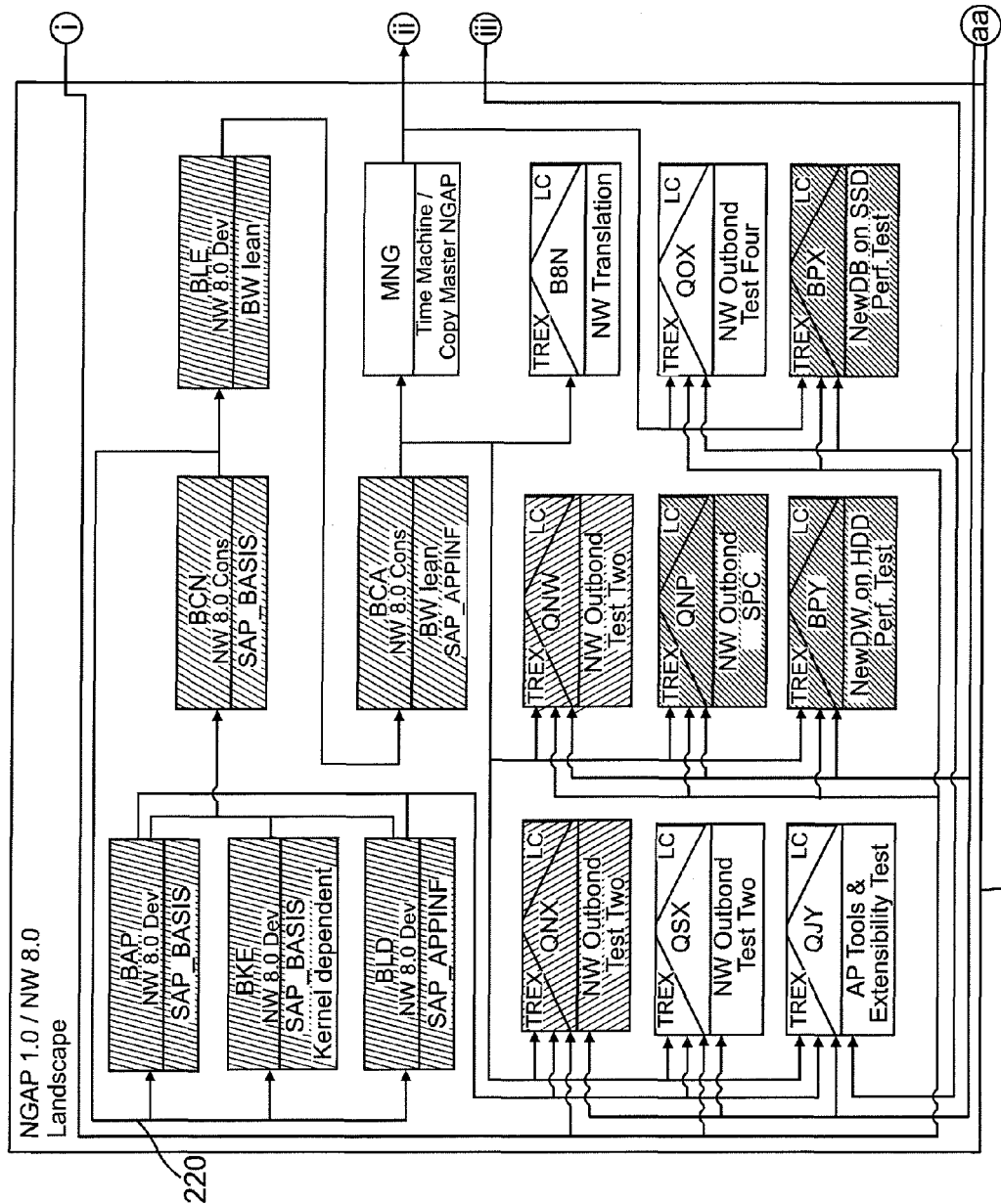
Figures 2, 2A, 3:
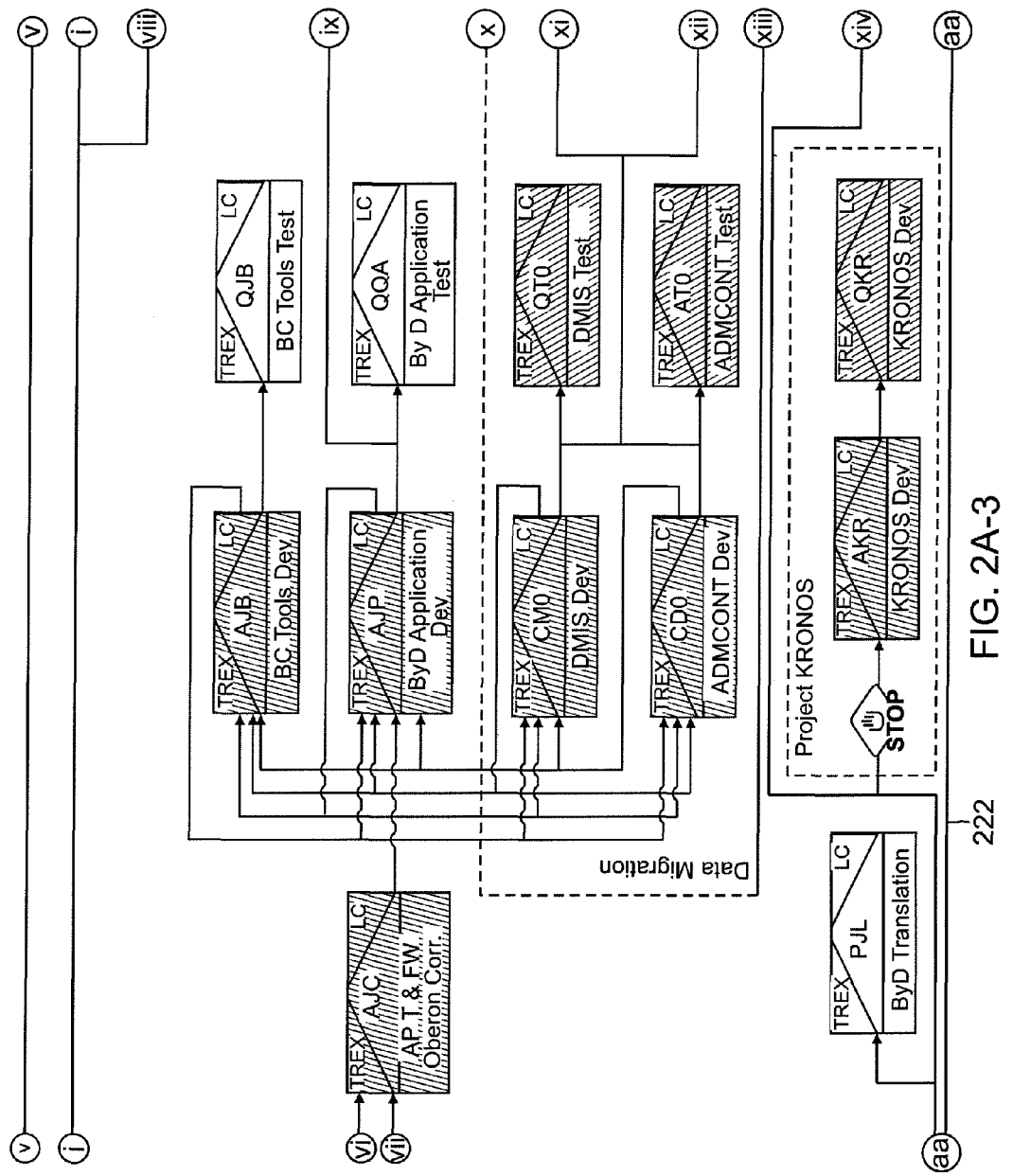
Figures 2, 2A, 3, 4:
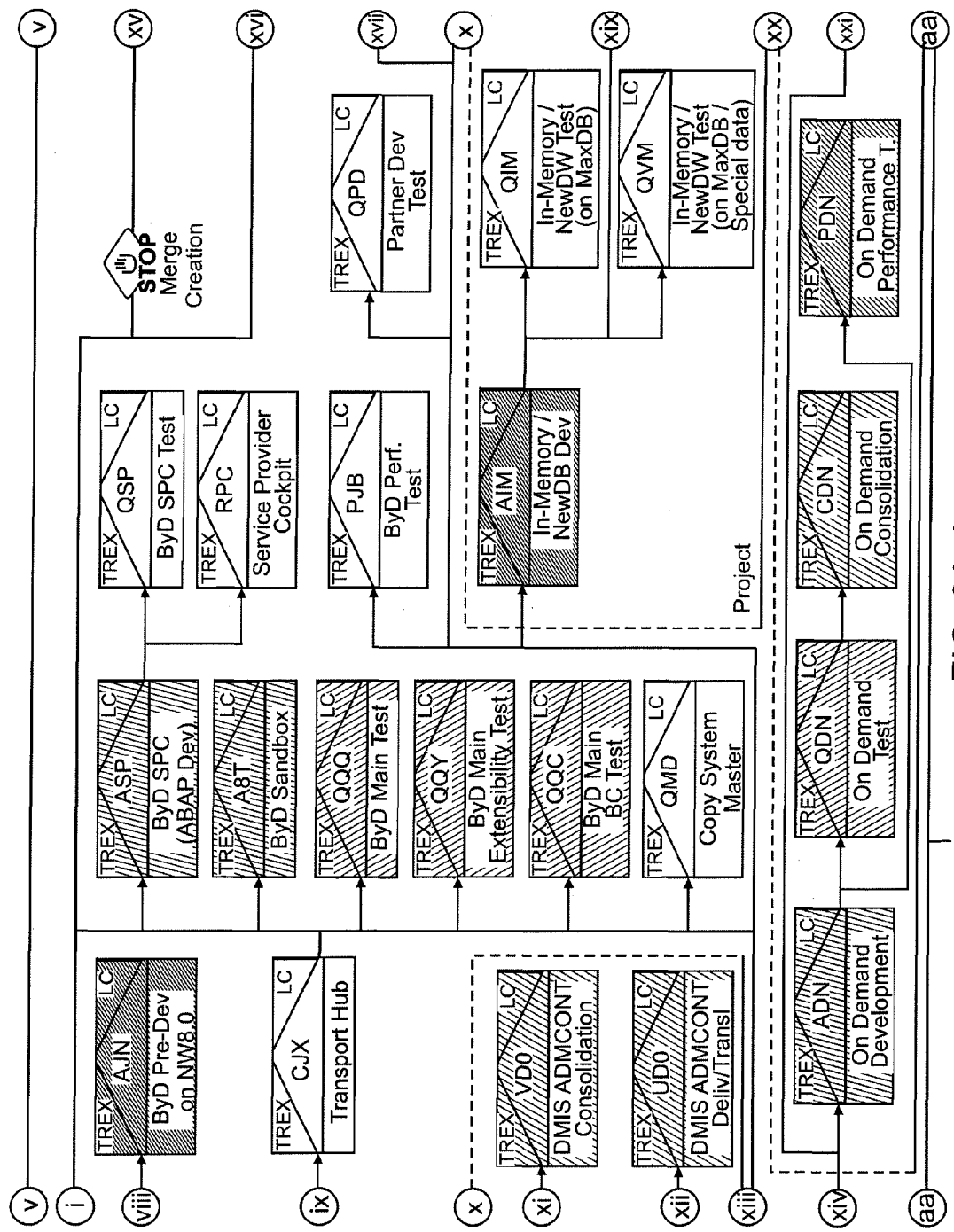
Figures 2, 2A, 3, 4, 5:
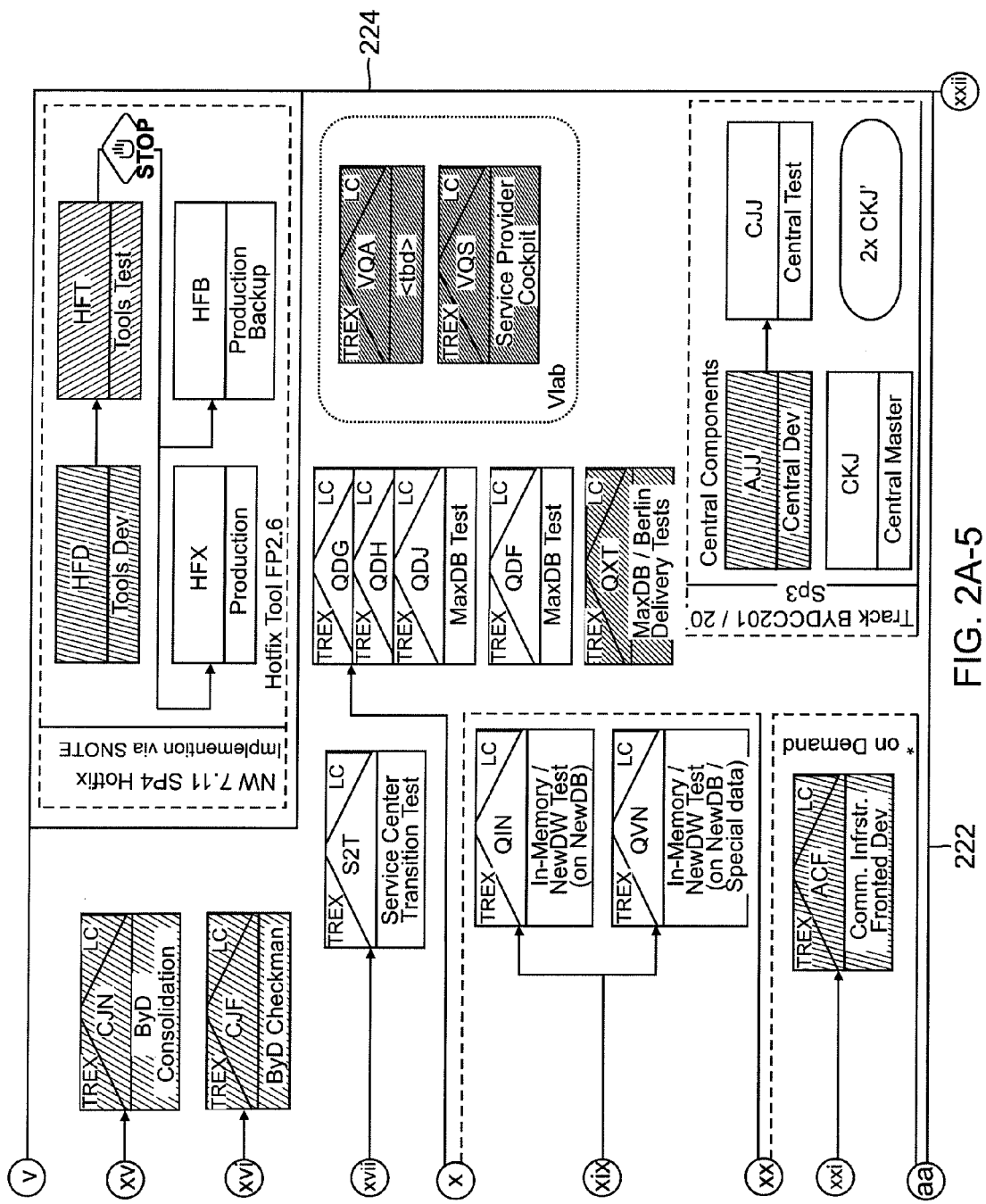
Figures 2, 2A, 3, 4, 5, 6:
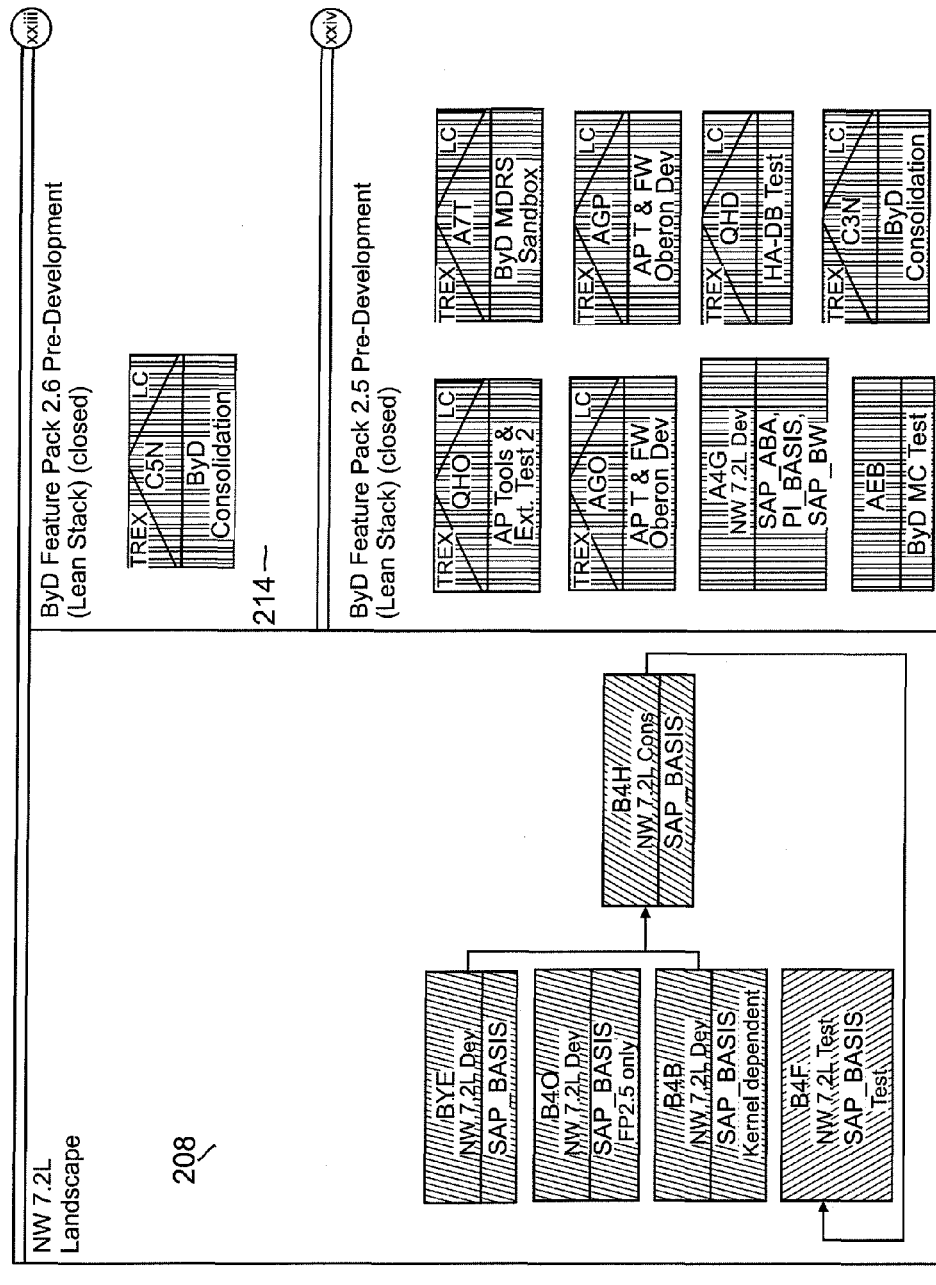
Figures 2, 2A, 3, 4, 5, 6, 7:
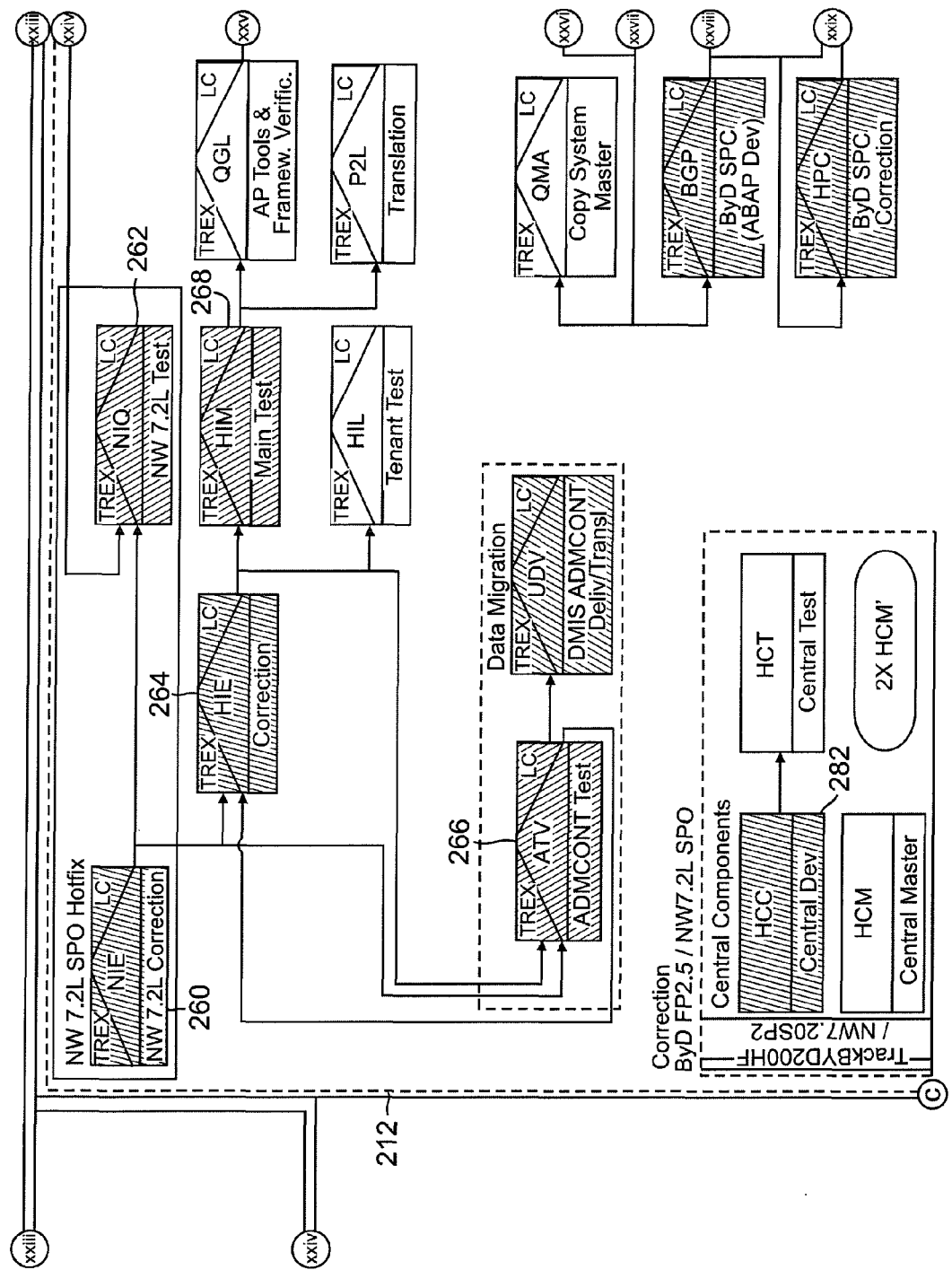
Figures 2, 2A, 3, 4, 5, 6, 7, 8:
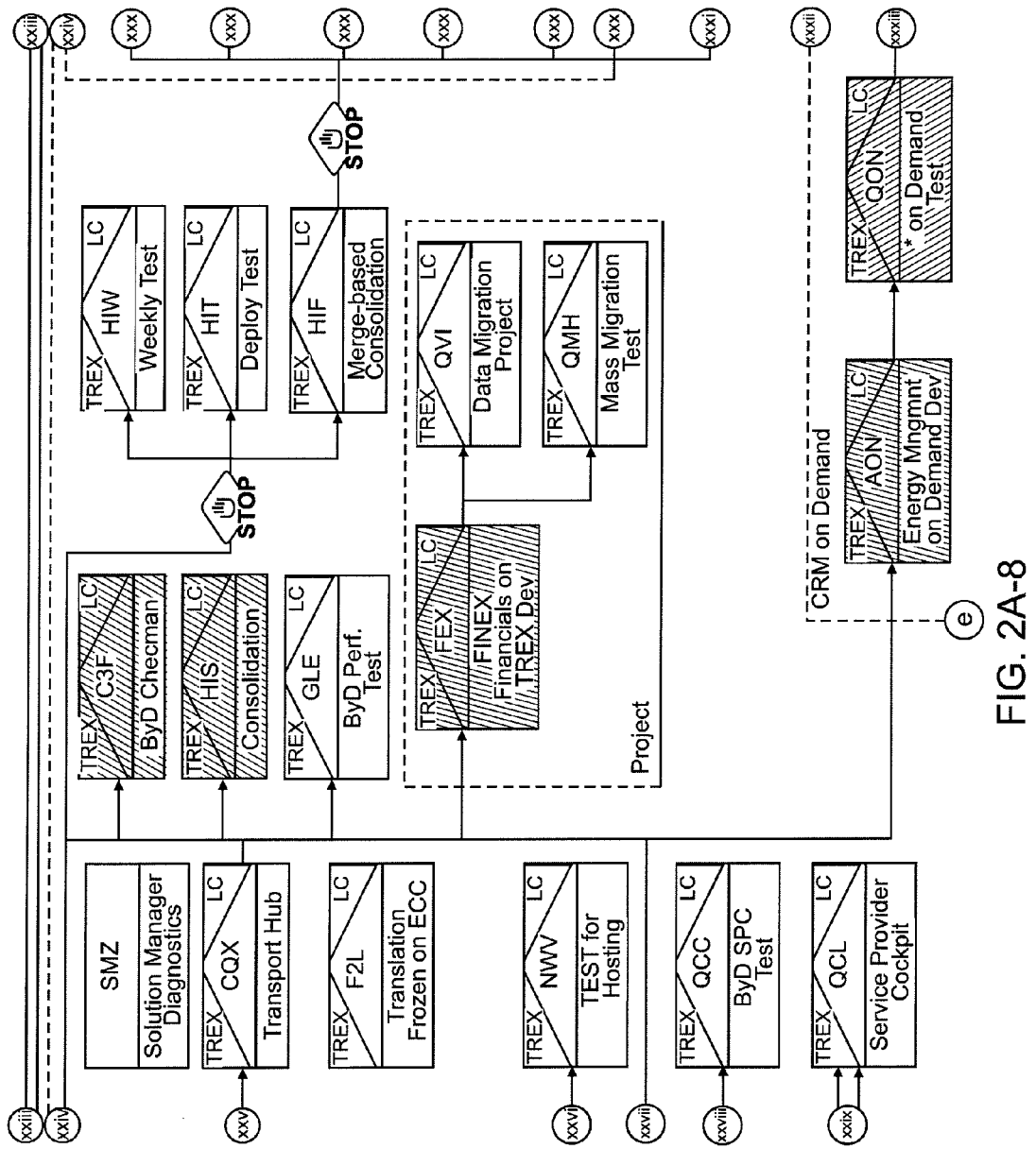
Figures 2, 2A, 3, 4, 5, 6, 7, 8, 9:
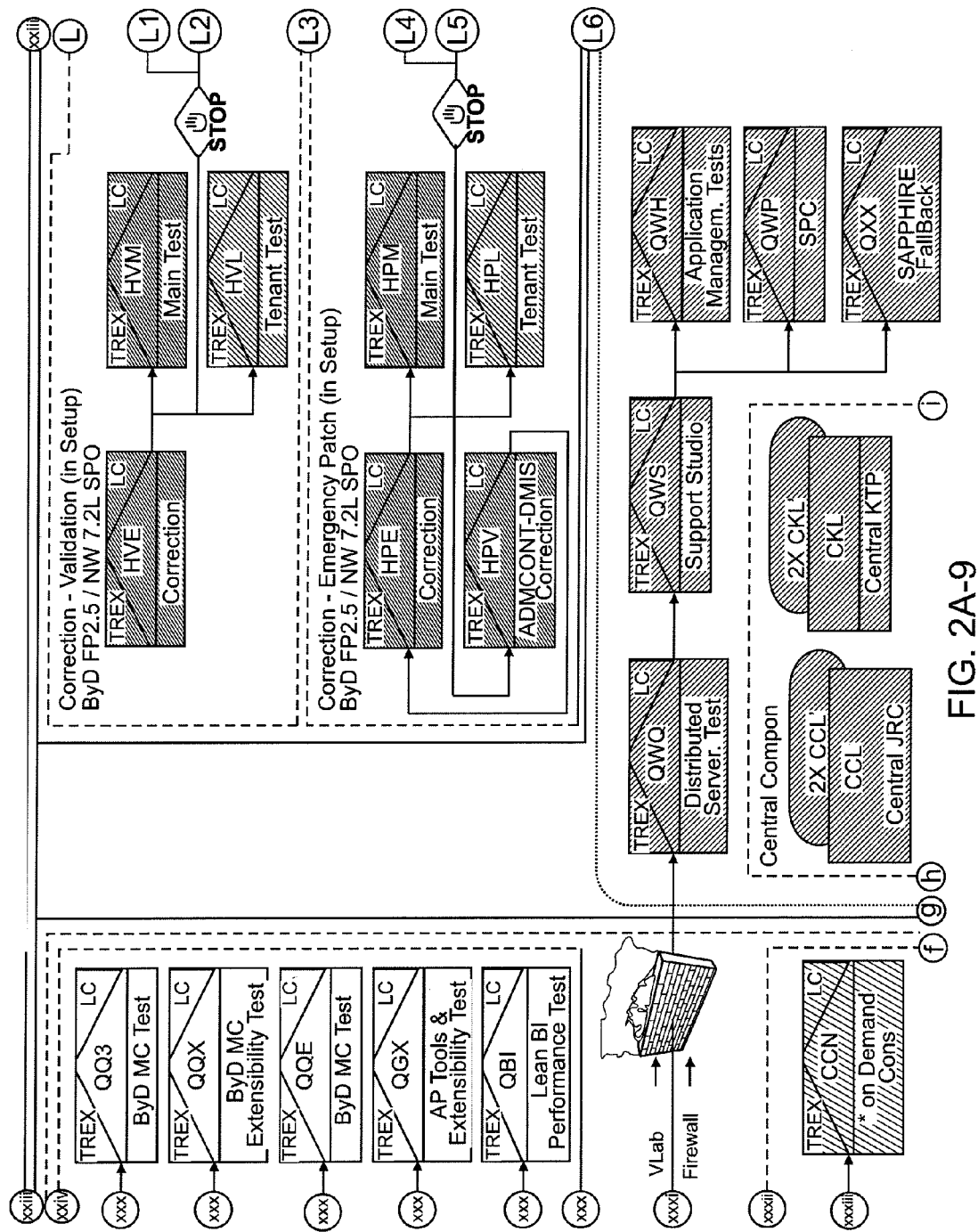
Figures 2, 2A, 3, 4, 5, 6, 7, 8, 9, 10:
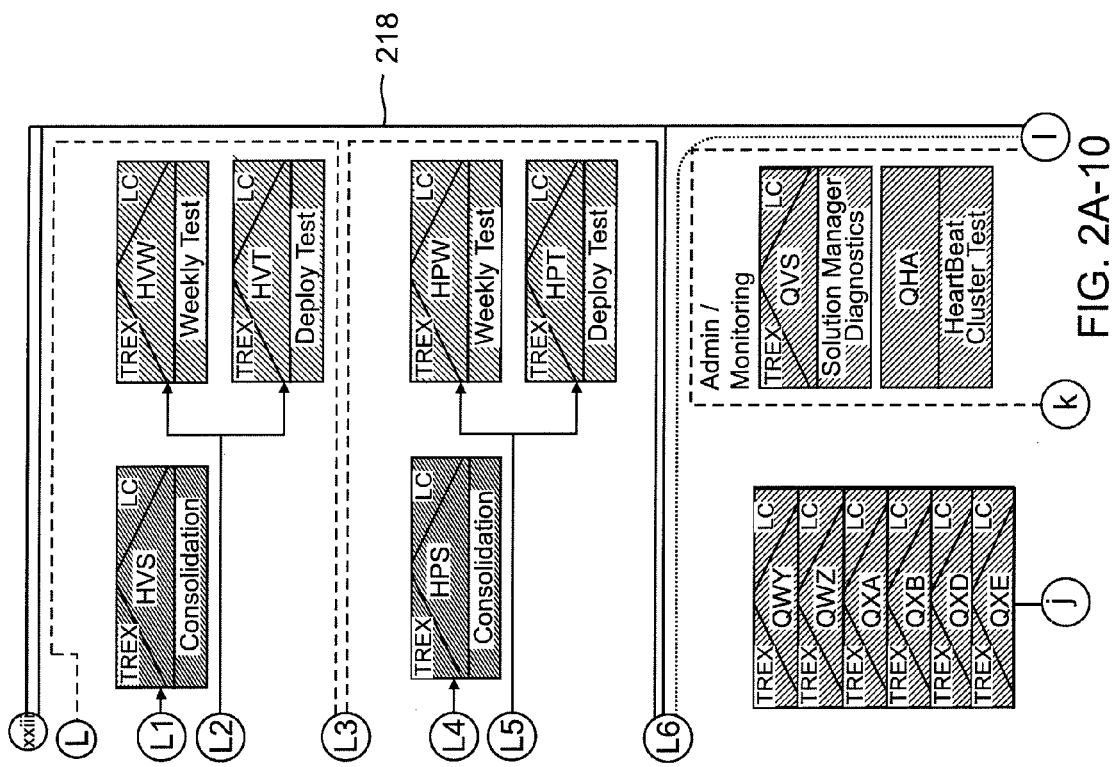
Figures 2, 2A, 3, 4, 5, 6, 7, 8, 9, 10, 11:
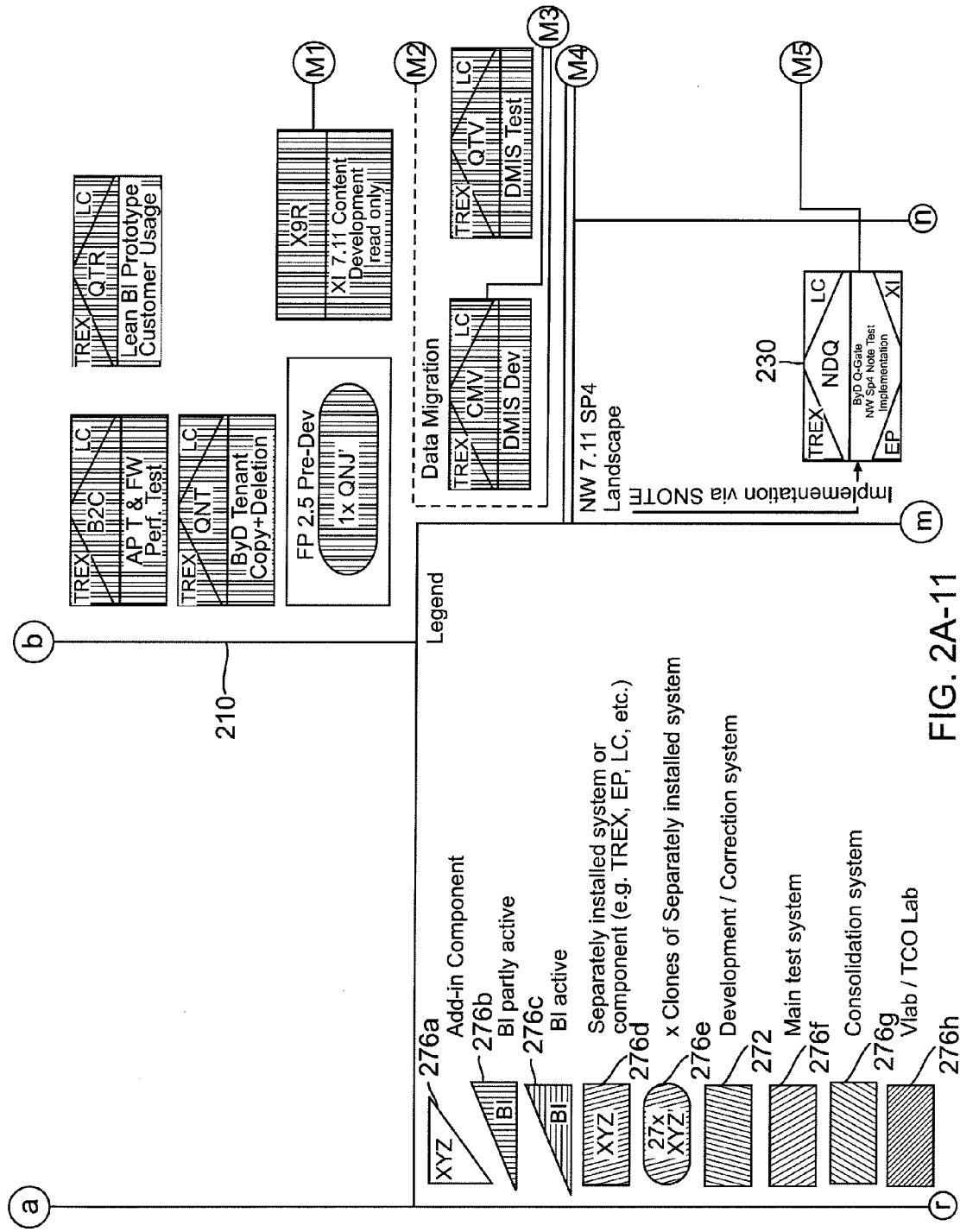
Figures 2, 2A, 3, 4, 5, 6, 7, 8, 9, 10, 11, 12:
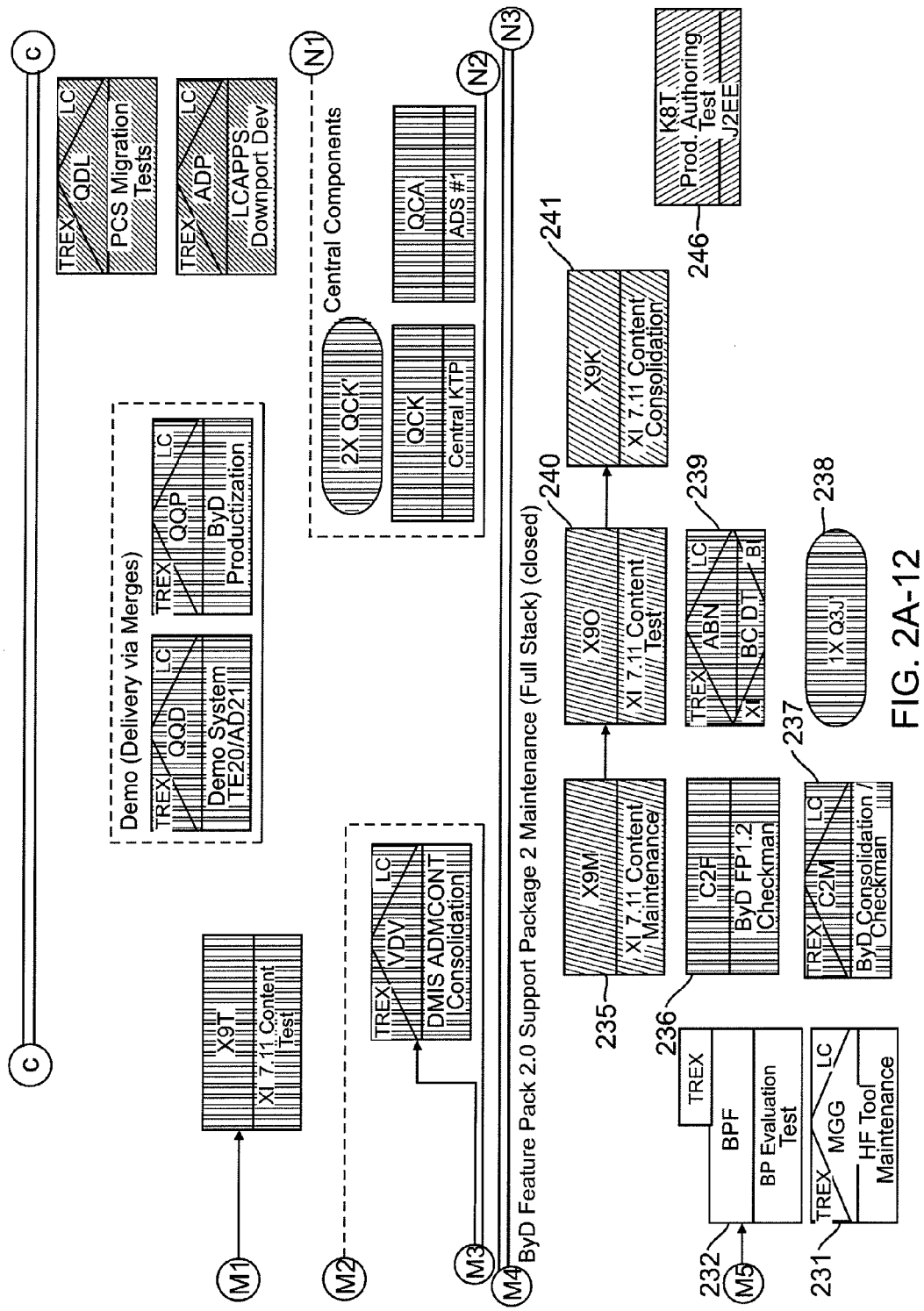
Figures 2, 2A, 3, 4, 5, 6, 7, 8, 9, 10, 11, 12, 13:
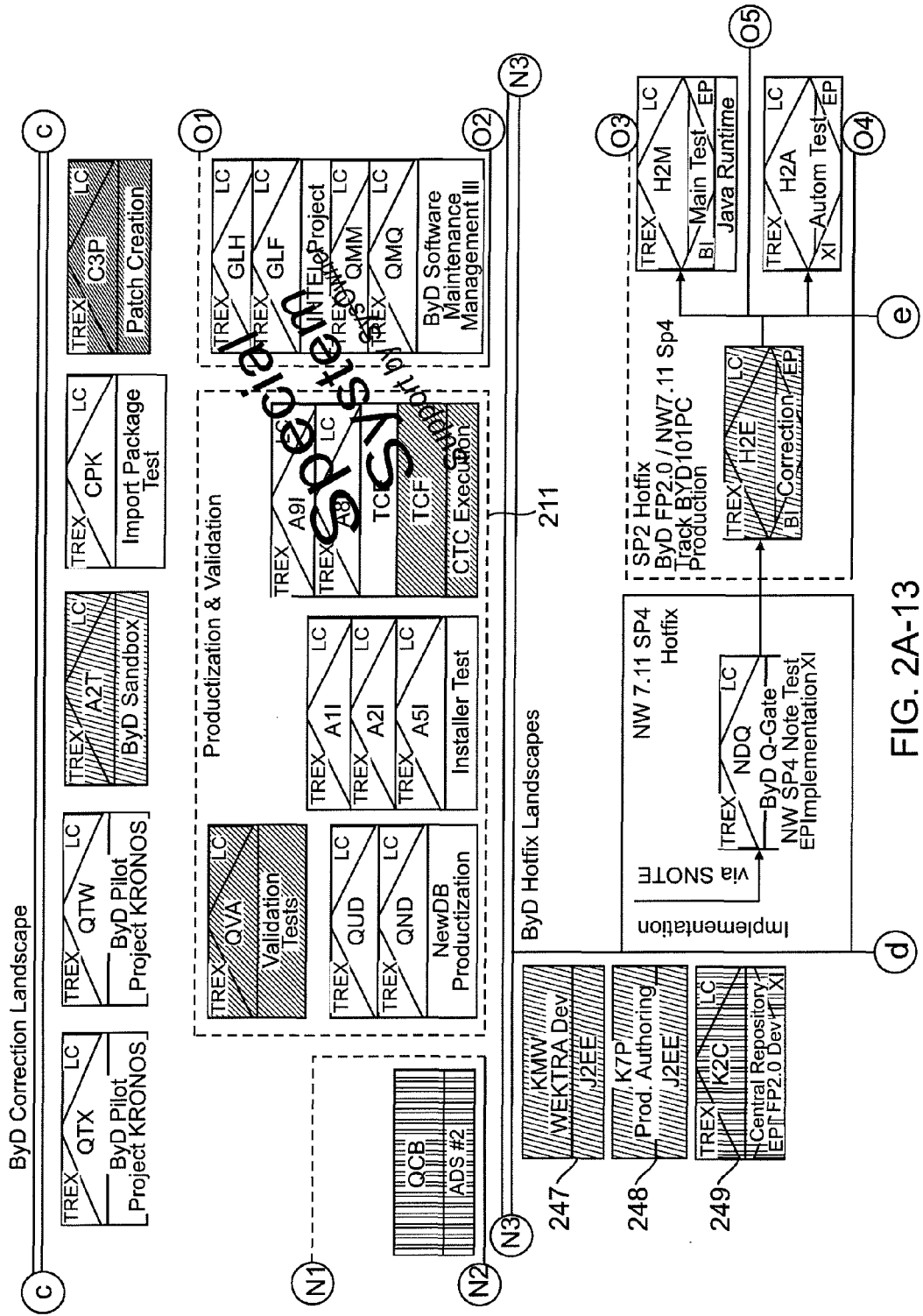
Figures 2, 2A, 3, 4, 5, 6, 7, 8, 9, 10, 11, 12, 13, 14:
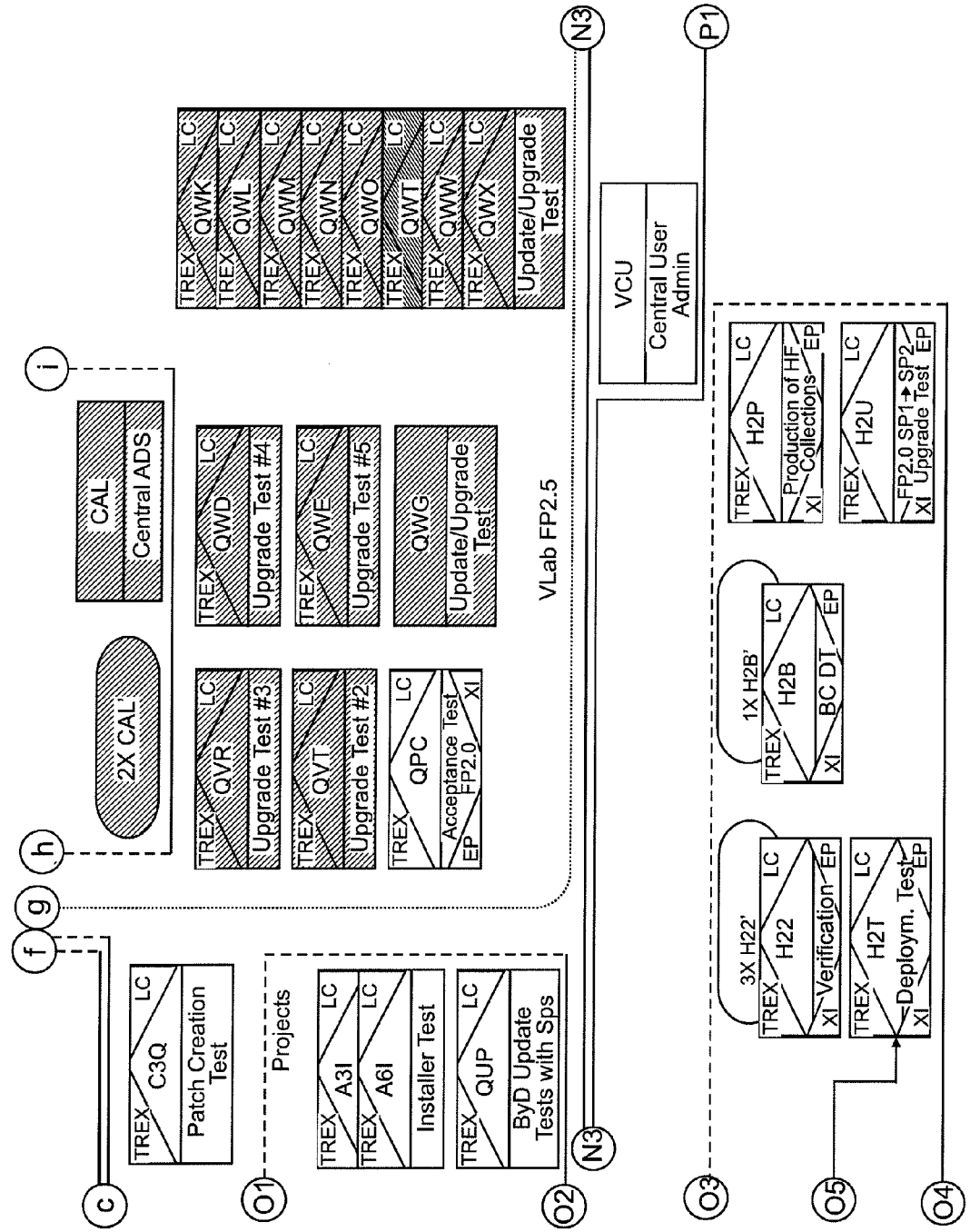
Figures 2, 2A, 3, 4, 5, 6, 7, 8, 9, 10, 11, 12, 13, 14, 15:
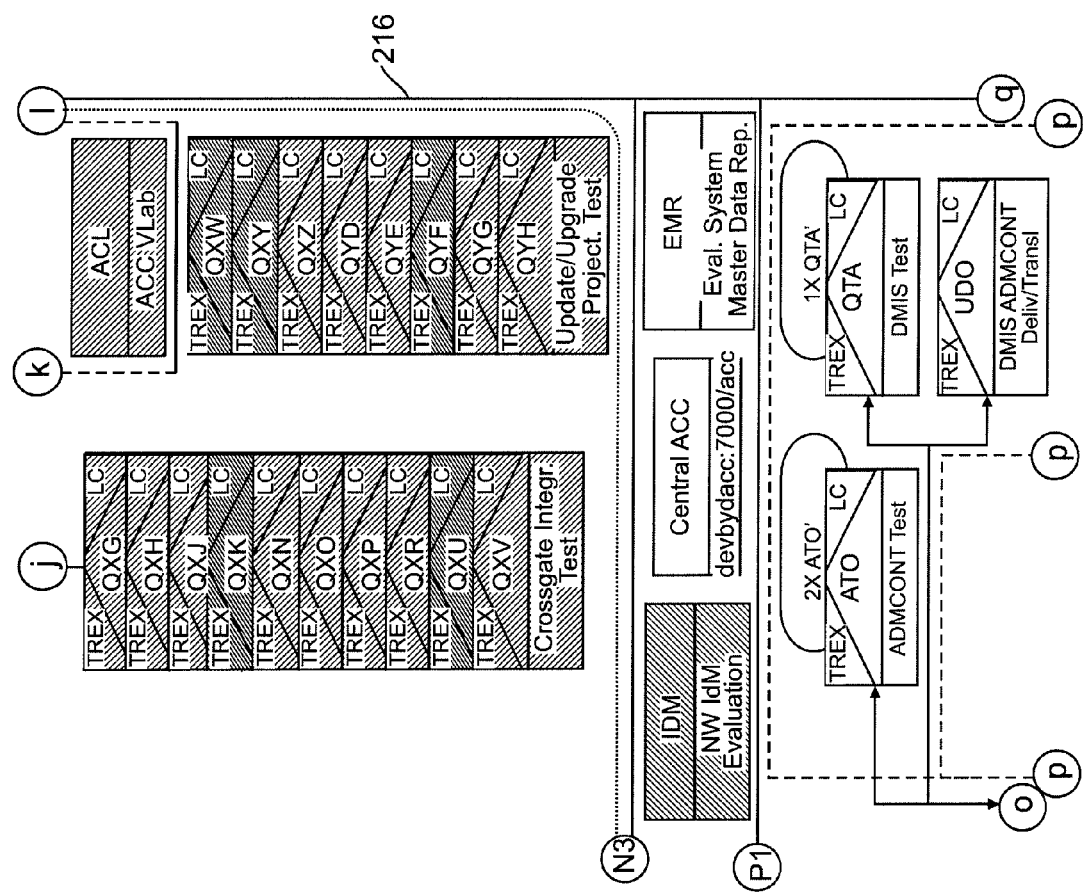
Figures 2, 2A, 3, 4, 5, 6, 7, 8, 9, 10, 11, 12, 13, 14, 15, 16:
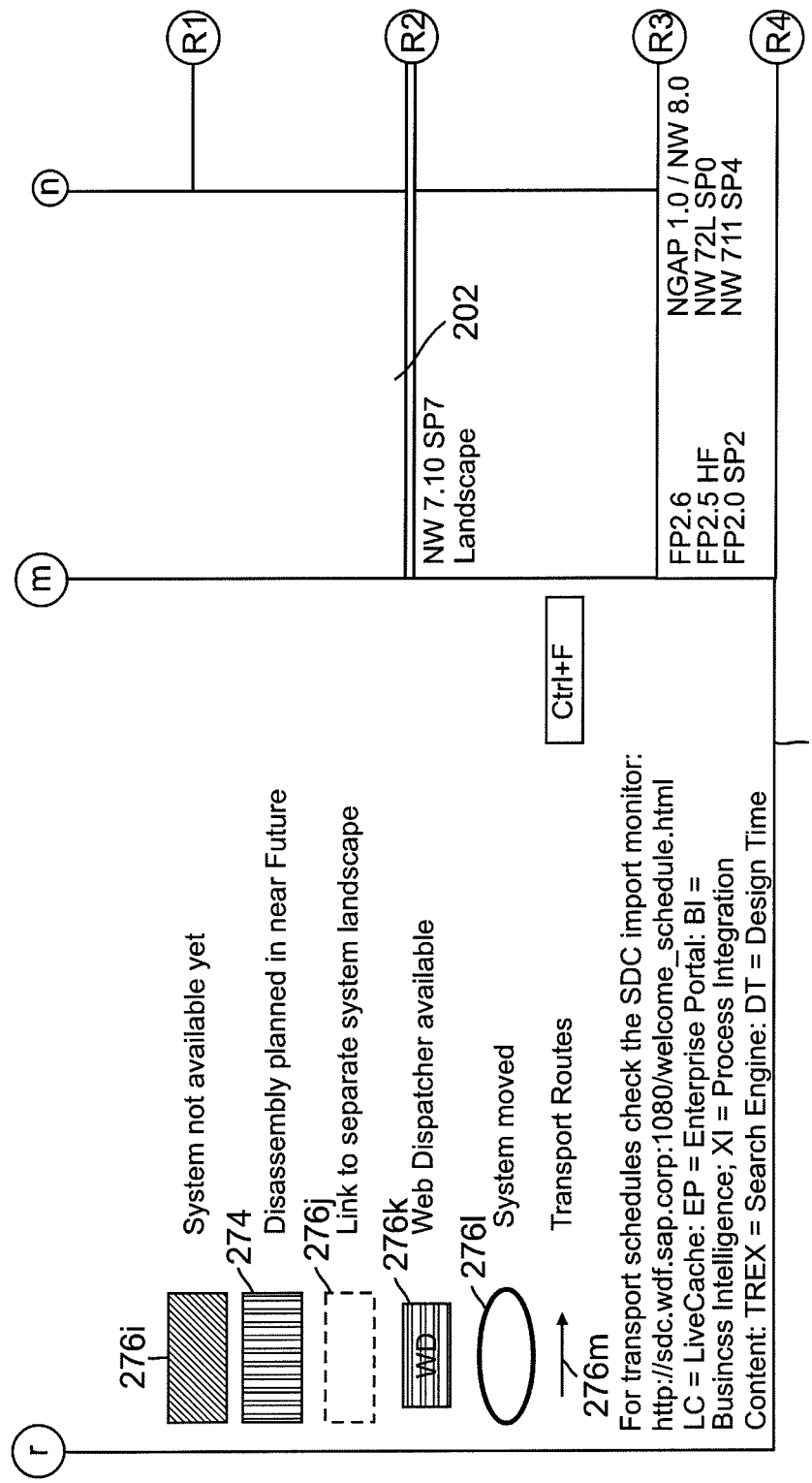
Figures 2, 2A, 3, 4, 5, 6, 7, 8, 9, 10, 11, 12, 13, 14, 15, 16, 17:
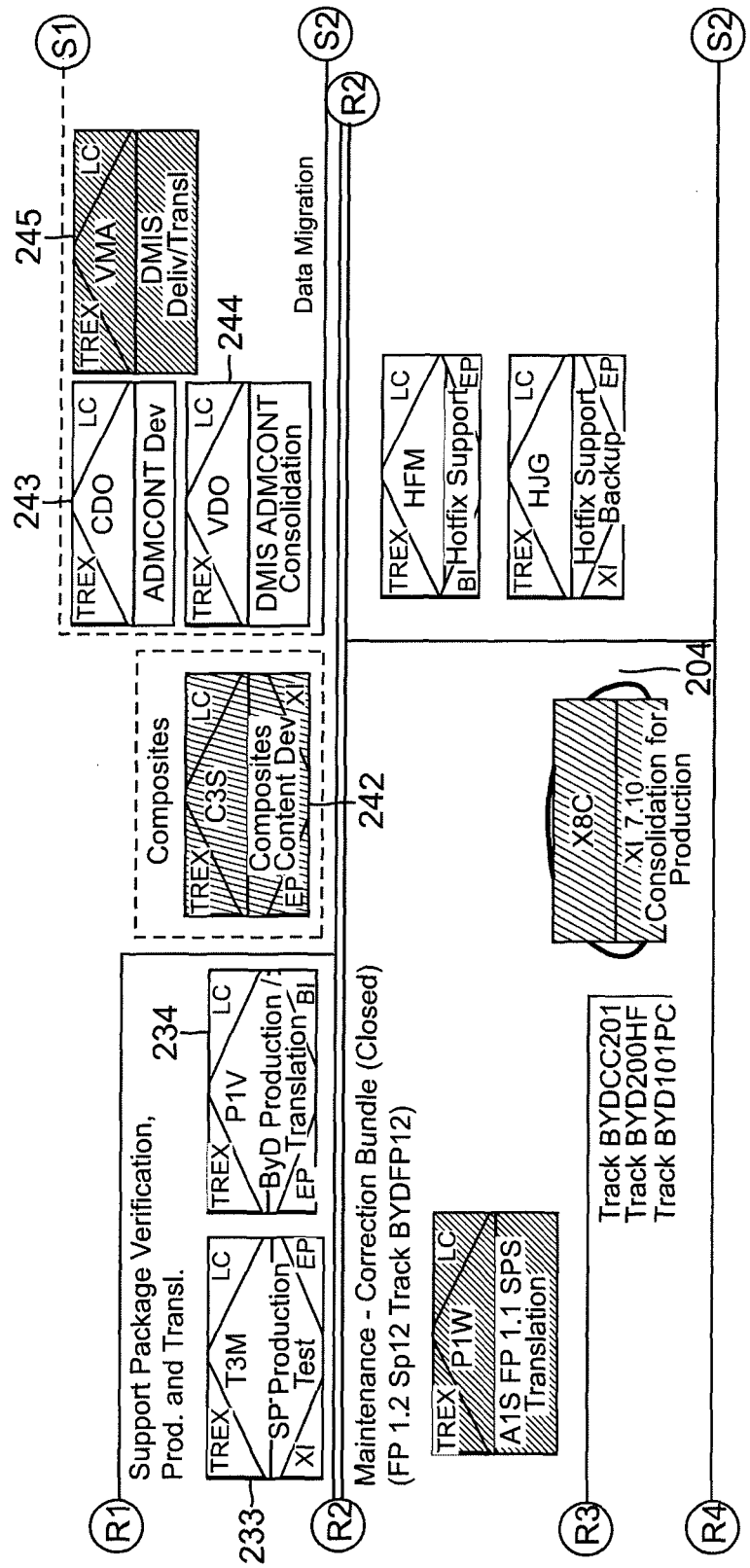
Figures 2, 2A, 3, 4, 5, 6, 7, 8, 9, 10, 11, 12, 13, 14, 15, 16, 17, 18:
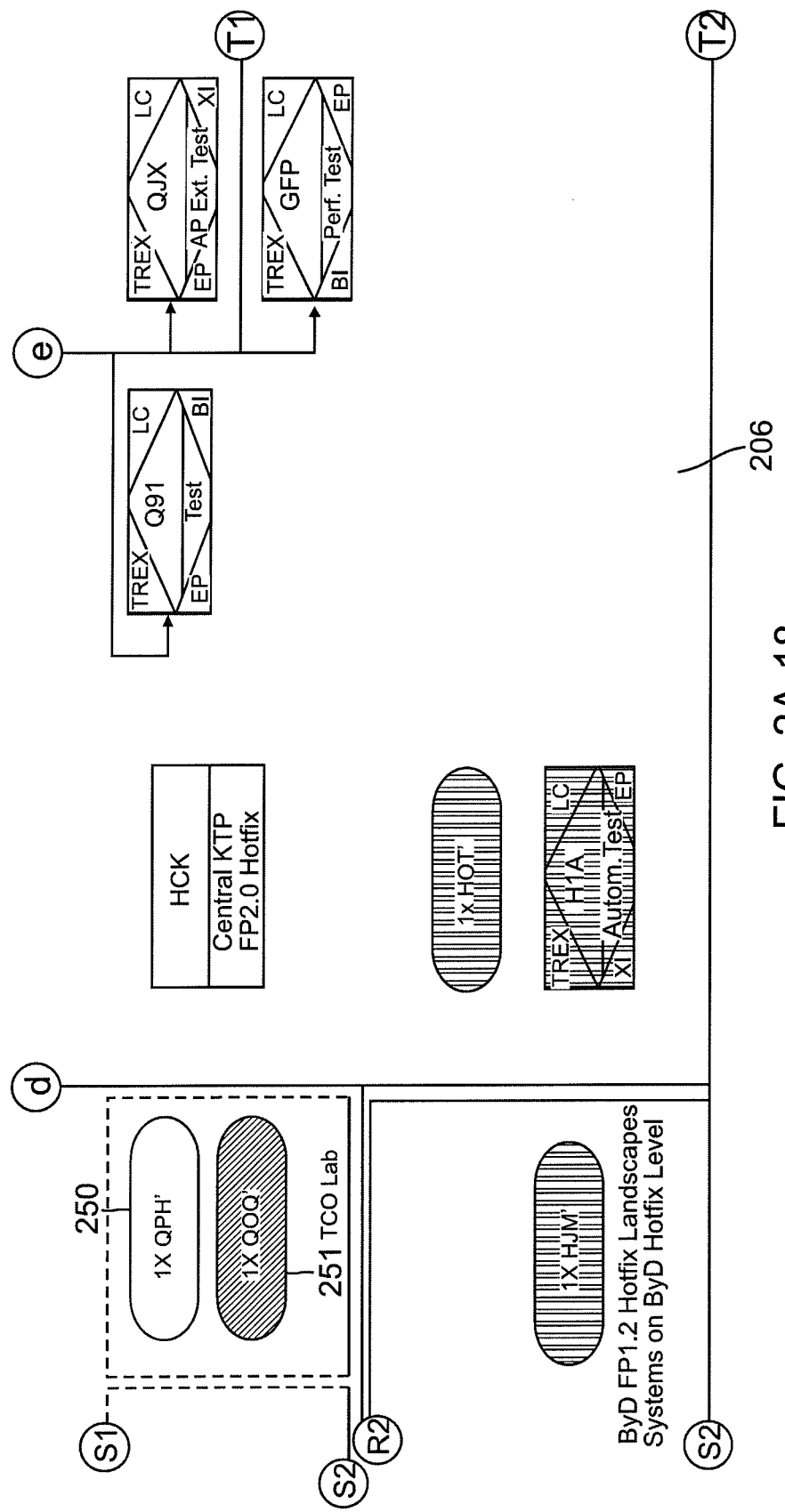
Figures 2, 2A, 3, 4, 5, 6, 7, 8, 9, 10, 11, 12, 13, 14, 15, 16, 17, 18, 19:
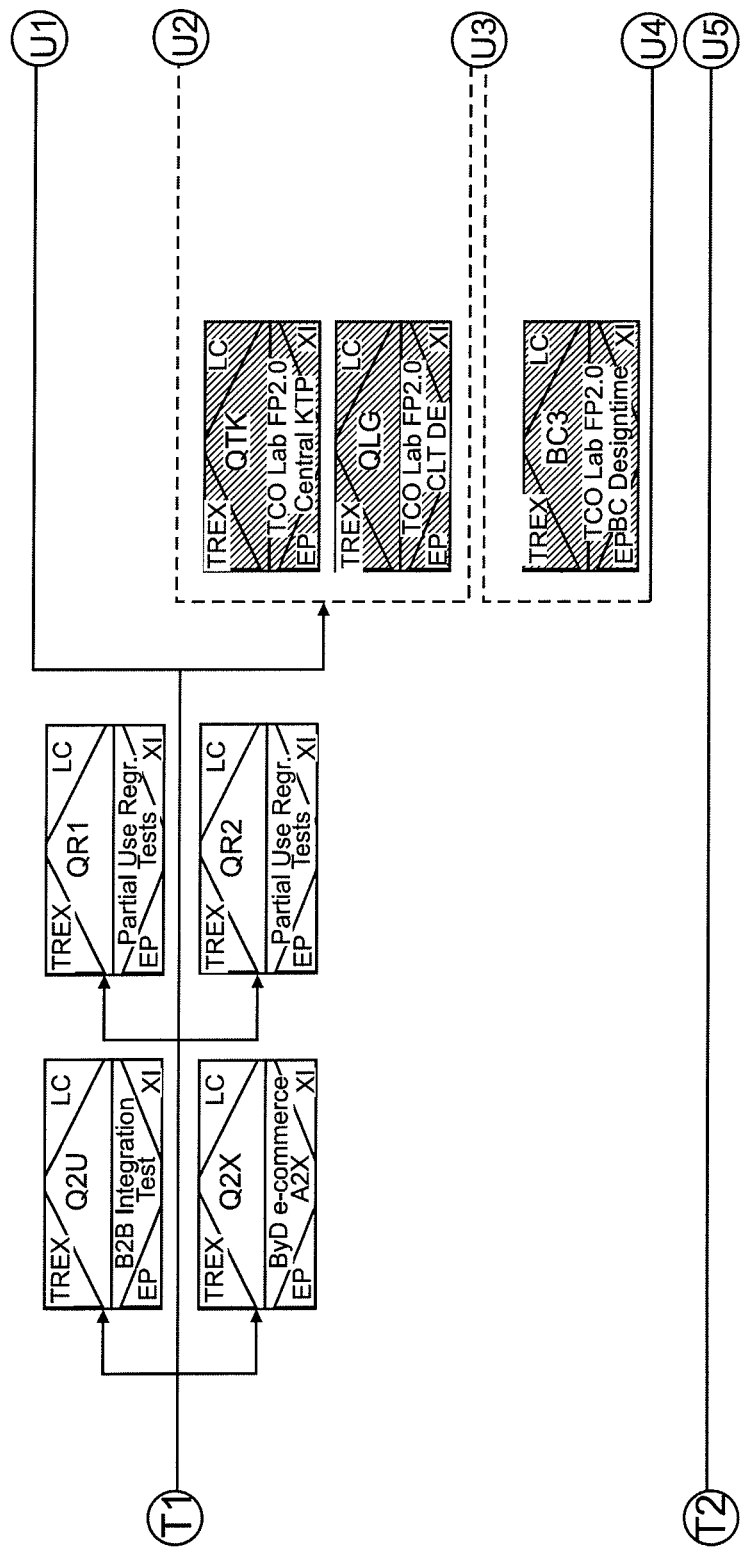
Figure 2B:
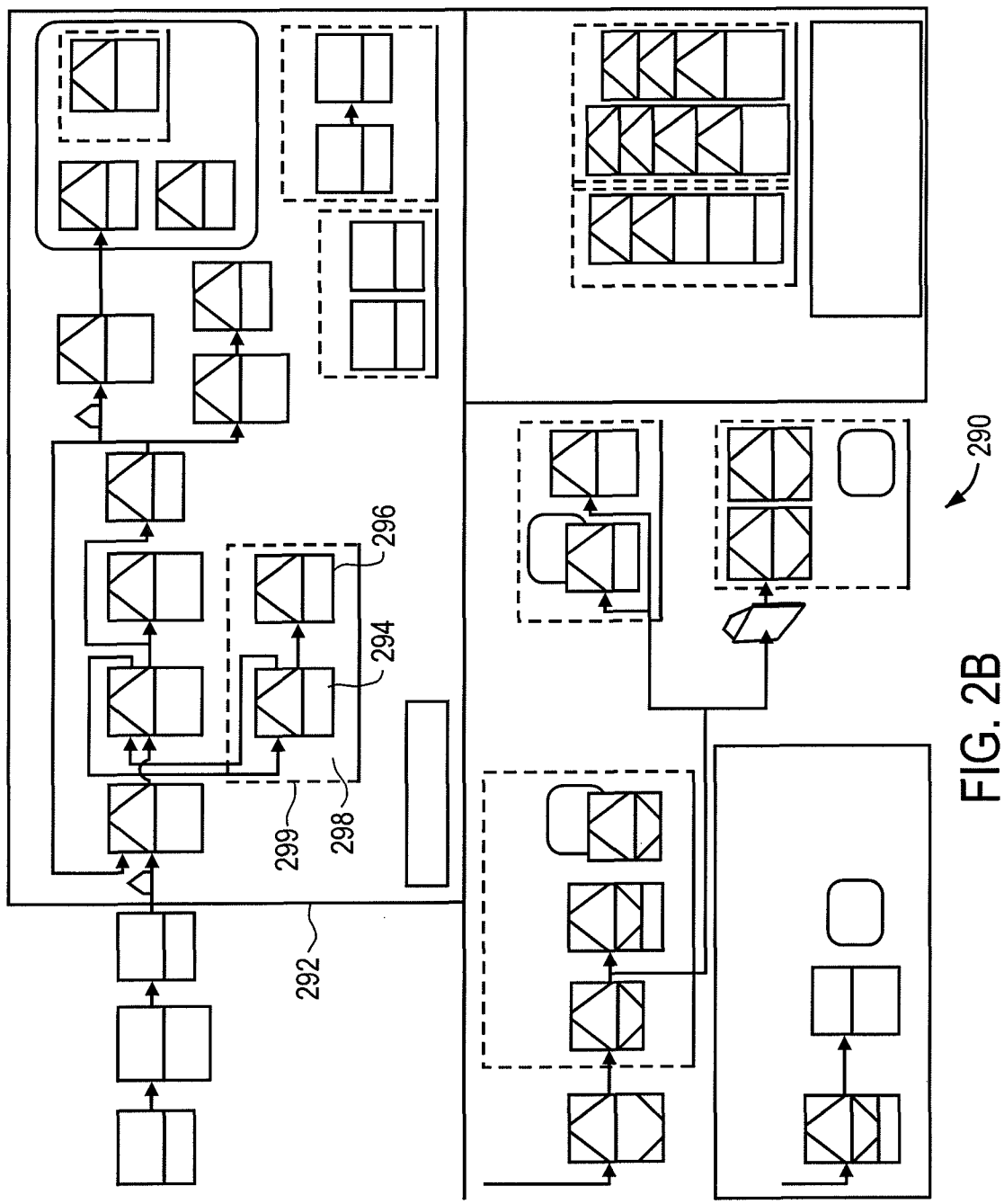
FIG. 2B is another example of a diagram.
Figure 3:
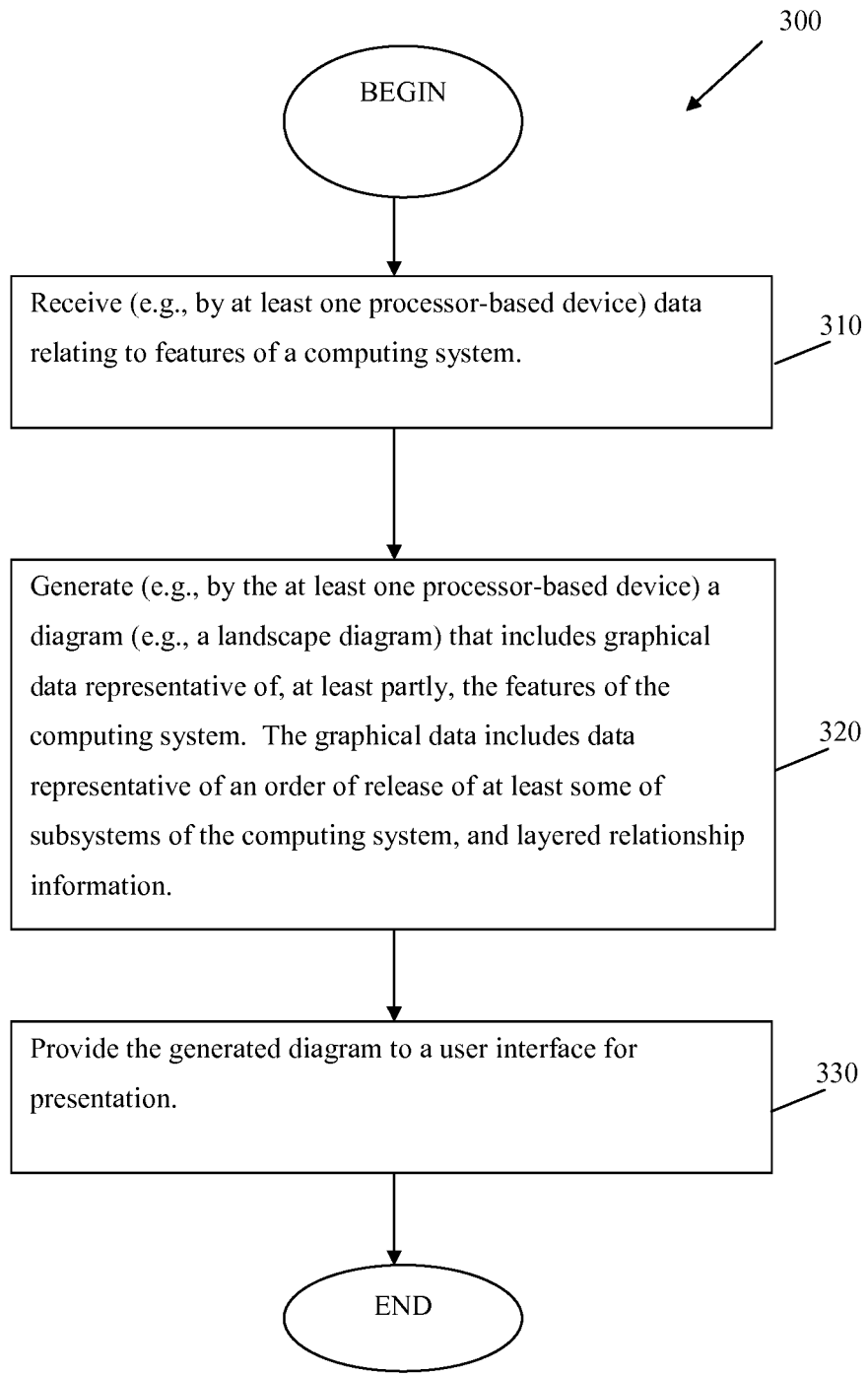
Figure 4:
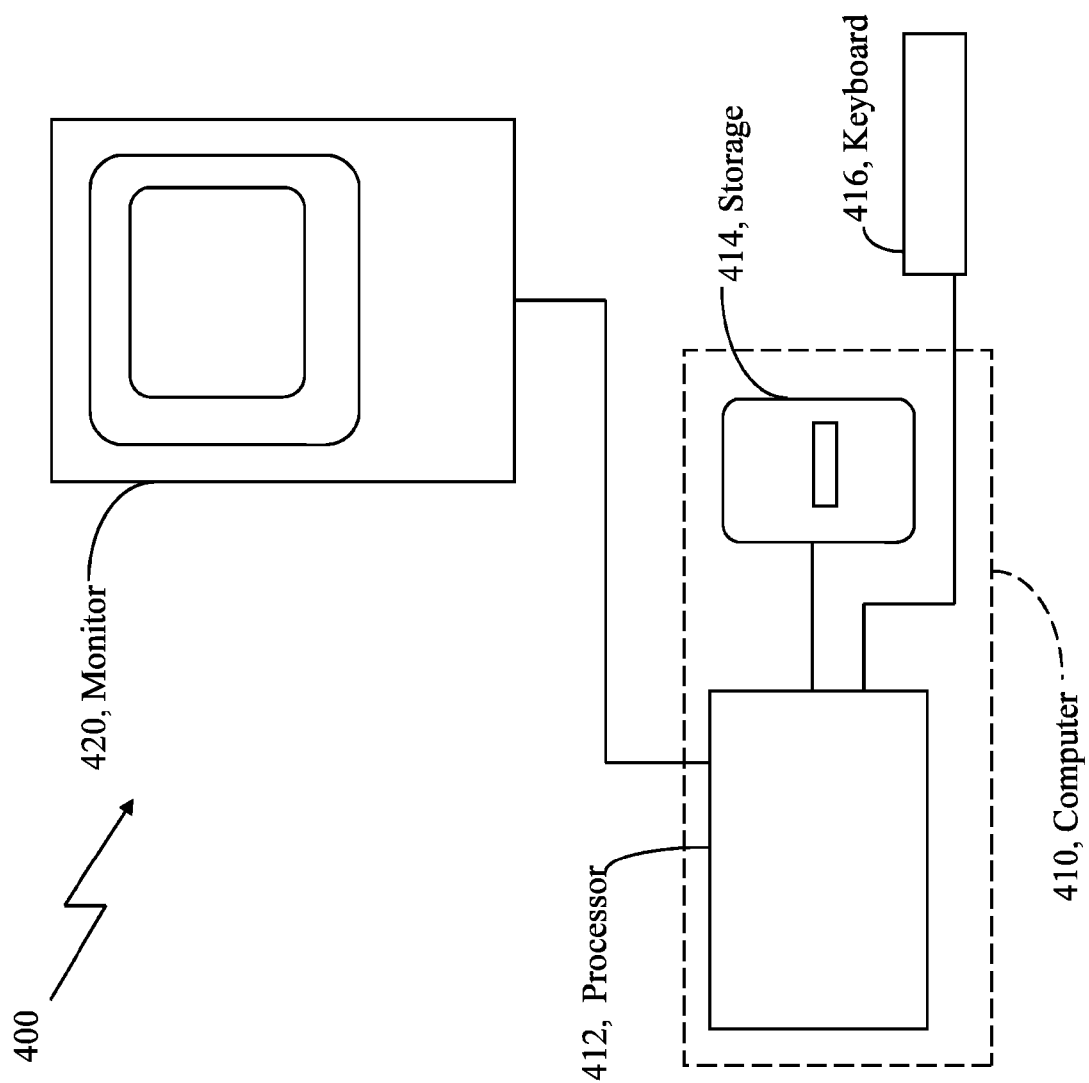

In some implementations, collection of configuration data (for the purpose of generating a diagram representative of various system features) may be performed by contacting various monitoring tools/applications, such as monitoring tool 108, deployed in the system 100 of FIG. 1. When the system whose representation is to be rendered is implemented, at least in part, using cloud computing, similar monitoring tools/applications may be deployed with the cloud computing. The various deployed monitoring tools/applications may be configured to perform tests/diagnostics on some or all of the subsystems (e.g., applications) constituting the system to be represented, to determine, for example, the applications' status and availability. Examples of suitable monitoring tools/applications include tools based on SMD/Wily monitoring technology (SMD is SAP's Solution Manager Diagnostics tool for monitoring large scale installations), and other types of health checks and monitoring tools. A description of some possible monitoring tools and arrangements that may be used is provided, for example, in application Ser. No. 12/624,279, entitled "SYSTEM MONITORING," the content of which is hereby incorporated by reference in its entirety.

After receiving/collecting data relating to features of the computing system, a diagram that includes data (e.g., graphical data) representative of, at least partly, the features of the computing system is generated 320. The data included in the generated diagram (e.g., landscape diagram) includes data representative of, at least, an order of release of at least some of subsystems of the computing system, and layered relationship information, such as information about the layered relationships between various of the subsystems of the computing system. In some implementations, the landscape diagram may include text-based data, color-based date, pre-defined geometrical shapes representative of some features, and/or pre-define fill-pattern data representative of some other features.

Generation of the diagram based on the previously received data pertaining to system features may be performed automatically by, for example, an application such as the application 190 depicted in FIG. 1A, using the data to determine, for example, positions in the diagram, as well as the symbols' colors and geometric shapes that are to be rendered in the diagram. For example, components of a subsystem determined to be associated with a recent release of a particular subsystem would be positioned at a high vertical position relative to earlier releases of other components of the particular subsystem.

The determined data (e.g., position, colors, patterns, shapes, text-based information, etc.) is then generated into a page, such as an hypertext transfer language page, and rendered in the diagram presented at a user interface. Additionally and/or alternatively, in some embodiments, custom-made diagram-generating applications may be developed and used to generate diagrams such as FIG. 2A.

The generated diagram is then provided 330 to a user interface for presentation. Such a user interface may be a user interface implemented at a server of a client (e.g., such as any of the clients 110A-C depicted in FIG. 1A).

Each of the various systems/components/devices depicted in FIG. 1 may be implemented using a processor-based computing device. Referring to FIG. 4, a schematic diagram of a computing system 400 that may be used in the implementation of any one of the various depicted systems/components/devices of FIG. 1 is shown. The computing system 400 includes a processor-based device 410 such as a desktop or laptop computer, wireless device, a personal computer, a personal digital assistant, a smart phone, a tablet computer, a specialized computing device, a reading machine, and so forth, that typically include a central processor unit 412. In addition to the central processor unit 412, the system includes one or more of the following: main memory, cache memory, bus interface circuits, network interfaces (e.g., wireless and/wired), and a location processor. The processor-based device 410 may also include a mass storage element 414. The computing system 400 may further include an input device, such as a keyboard 416, and a display 420, e.g., a LCD (liquid crystal display) monitor.

The processor-based device 410 is configured to perform some or all of the operations described herein, including operations to collect and receive data relating to features of a computing system, and to generate, based on the received data, a diagram that includes graphical data representative of the system's features. The storage device 414 may include computer program products that when executed on the processor-based device 410 cause at least some of the operations for receiving data relating to system features and generating a diagram based, at least in part, on that data.

The processor-based device may further include peripheral devices to enable input/output functionality. Such peripheral devices include, for example, a DVD drive or a network connection, for downloading related content to the connected system. Such peripheral devices may also be used for downloading software containing computer instructions to enable general operation of the respective system/device, and for downloading software implemented programs to perform operations pertaining to the procedures and operations described herein. Alternatively and/or additionally, in some implementations, special purpose logic circuitry, e.g., an FPGA (field programmable gate array) or an ASIC (application-specific integrated circuit) may be used in the implementation of the system 400.

Other modules that may be included with the processor-based device 410 are speakers, a sound card, a pointing device, e.g., a mouse, a trackball, and/or a stylus, by which the user can provide input to the computing system 400. Other kinds of devices can be used to provide for interaction with a user. For example, feedback provided to the user can be any form of sensory feedback, e.g., visual feedback, auditory feedback, or tactile feedback, and input from the user can be received in any form, including acoustic, speech, tactile input, etc. The processor-based device 410 may include an operating system.

The subject matter described herein can be implemented in digital electronic circuitry, in computer software, firmware, hardware, or in combinations of them. The subject matter described herein can be implemented as one or more computer program products, i.e., one or more computer programs tangibly embodied in non-transitory media, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server may arise by virtue of computer programs running on the respective computers and having a client-server relationship to each other.

A number of implementations of the invention have been described. Nevertheless, it will be understood that various modifications may be made without departing from the spirit and scope of the invention. Accordingly, other embodiments are within the scope of the following claims.

What is claimed is:

1. A method comprising:
   receiving data relating to features of a computing system;
   generating a flow diagram with at least two axes including graphical data representative of, at least partly, the features of the computing system, wherein along an axis of the flow diagram is an ordered release history of a plurality of subsystems of the computing system, wherein along another axis of the flow diagram is layered relationship information between the plurality of subsystems, and wherein each of the plurality of subsystems is at least one of: an application, a system comprising several applications, or a representation of a network arrangement;

wherein the layered relationship information includes at least a hierarchy of the plurality of subsystems, the flow diagram comprising a graphical arrangement of blocks in which positioning of a block in the arrangement of blocks along the axis represents a position in the ordered release history of a subsystem represented by the block, and positioning of the block in the arrangement of blocks along the other axis represents the layered relationship of the subsystem represented by the block relative to another subsystem represented by another block, wherein the axis is oriented perpendicular to the other axis;

dividing the subsystem into a plurality of components, wherein each of the components are positioned into the blocks representing the subsystem in the arrangement of blocks according to the particular component release date along the axis indicating when a particular functionality of the subsystem was implemented;

wherein the blocks of the flow diagram depict the subsystems with a graphical representation of the arrangement of the components constituting that particular subsystem;

wherein each component, represented by an icon, is one of a data processing equipment type or a developmental feature, with an associated lifecycle status; and providing the generated flow diagram to a user interface for presentation, wherein the receiving, the generating, and the providing are performed by at least one processor.

2. The method of claim 1, wherein the flow diagram further includes data representative of data flow for at least one of the subsystems of the computing system.

3. The method of claim 2, wherein the data representative of the data flow includes graphical representation of data flow between components of the at least one of the subsystems of the computing system.

4. The method of claim 1, wherein the flow diagram further includes at least one of text-based data, pattern-based data, and color-based data, representative of at least one of: developmental status for at least one of the subsystems of the computing system, usage for the at least one of the subsystems of the computing system, and number of installed layers.

5. The method of claim 1, wherein one or more processing components of at least one of the subsystems of the computing system are represented as square icons, each of the square icons including at least one of: color-based information representative of data processing equipment type for an associated data processing component, color based information representative of a developmental status of the associated data processing component, a component name of the associated data processing component, a description of the associated data processing component, structure information for the associated data processing component, and information regarding the use for the associated data processing component.

6. The method of claim 1, wherein receiving the data relating to the features of the computing system comprises:

receiving data from a landscape directory maintaining landscape data for multiple tenants with access to the computing system.

7. The method of claim 1, wherein at least one of the plurality of subsystems is lower in the hierarchy than another of the plurality of subsystems, and wherein the block corresponding to the subsystem lower in the hierarchy is located closer to an origin of the other axis than the block corresponding to the other subsystem higher in the hierarchy.

8. An apparatus comprising:
at least one processor; and
at least one memory including computer program code, the at least one processor, the at least one memory, and the computer program code configured to cause the apparatus to:

receive data relating to features of a computing system;

generate a flow diagram with at least two axes including graphical data representative of, at least partly, the features of a computing system, wherein along an axis of the flow diagram is an ordered release history of a plurality of subsystems of the computing system, wherein along another axis of the flow diagram is layered relationship information between the plurality of subsystems, and wherein each of the plurality of subsystems is at least one of: an application, a system comprising several applications, or a representation of a network arrangement;

wherein the layered relationship information includes at least a hierarchy of the plurality of subsystems, the flow diagram comprising a graphical arrangement of blocks in which positioning of a block in the arrangement of blocks along the axis represents a position in the ordered release history of a subsystem represented by the block, and positioning of the block in the arrangement of blocks along the other axis represents the layered relationship of the subsystem represented by the block relative to another subsystem represented by another block, wherein the axis is oriented perpendicular to the other axis;

dividing the subsystem into a plurality of components, wherein each of the components are positioned into the blocks representing the subsystem in the arrangement of blocks according to the particular component release date along the axis indicating when a particular functionality of the subsystem was implemented;

wherein the blocks of the flow diagram depict the subsystems with a graphical representation of the arrangement of the components constituting that particular subsystem;

wherein each component, represented by an icon, is one of a data processing equipment type or a developmental feature, with an associated lifecycle status; and providing the generated flow diagram to a user interface for presentation.

9. The apparatus of claim 8, wherein the flow diagram further includes data representative of data flow for at least one of the subsystems of the computing system.

10. The apparatus of claim 9, wherein the data representative of the data flow includes graphical representation of data flow between components of the at least one of the subsystems of the computing system.

11. The apparatus of claim 8, wherein the flow diagram further includes at least one of text-based data, pattern-based data, and color-based data, representative of at least one of: developmental status for at least one of the subsystems of the computing system, usage for the at least one of the subsystems of the computing system, and number of installed layers.

12. The apparatus of claim 8, wherein one or more processing components of at least one of the subsystems of the computing system are represented as square icons, each of the square icons including at least one of: color-based information representative of data processing equipment type for an associated data processing component, color based information representative of a developmental status of the associated data processing component, a component name of the associated data processing component, a description of the associated data processing component, structure information for the associated data processing component, and information regarding the use for the associated data processing component.

13. The apparatus of claim 8, further configured to:
receive data from a landscape directory maintaining landscape data for multiple tenants with access to the computing system.

14. The apparatus of claim 8, wherein at least one of the plurality of subsystems is lower in the hierarchy than another of the plurality of subsystems, and wherein the block corresponding to the subsystem lower in the hierarchy is located closer to an origin of the other axis than the block corresponding to the other subsystem higher in the hierarchy.

15. A non-transitory computer-readable medium encoded with instructions that, when executed by at least one processor cause operations comprising:
receiving data relating to features of a computing system;
generating, by the at least one processor-based device, a flow diagram with at least two axes including graphical data representative of, at least partly, the features of the computing system, wherein along an axis of the flow diagram is an ordered release history of a plurality of subsystems of the computing system, wherein along another axis of the flow diagram is layered relationship information between the plurality of subsystems, and wherein each of the plurality of subsystems is at least one of: an application, a system comprising several applications, or a representation of a network arrangement;
wherein the layered relationship information includes at least a hierarchy of the plurality of subsystems, the flow diagram comprising a graphical arrangement of blocks in which positioning of a block in the arrangement of blocks along the axis represents a position in the ordered release history of a subsystem represented by the block, and positioning of the block in the arrangement of blocks along the other axis represents the layered relationship of the subsystem represented by the block relative to another subsystem represented by another block, wherein the axis is oriented perpendicular to the other axis;
dividing the subsystem into a plurality of components, wherein each of the components are positioned into the blocks representing the subsystem in the arrangement of blocks according to the particular component release date along the axis indicating when a particular functionality of the subsystem was implemented;
wherein the blocks of the flow diagram depict the subsystems with a graphical representation of the arrangement of the components constituting that particular subsystem;
wherein each component, represented by an icon, is one of a data processing equipment type or a developmental feature, with an associated lifecycle status; and
providing the generated flow diagram to a user interface for presentation.

16. The non-transitory computer-readable medium of claim 15, wherein the flow diagram further includes data representative of data flow for at least one of the subsystems of the computing system.

17. The non-transitory computer-readable medium of claim 16, wherein the data representative of the data flow includes graphical representation of data flow between components of the at least one of the subsystems of the computing system.

18. The non-transitory computer-readable medium of claim 15, wherein the flow diagram further includes at least one of text-based data, pattern-based data, and color-based data, representative of at least one of: developmental status for at least one of the subsystems of the computing system, usage for the at least one of the subsystems of the computing system, and number of installed layers.

19. The non-transitory computer-readable medium of claim 15, wherein one or more processing components of at least one of the subsystems of the computing system are represented as square icons, each of the square icons including at least one of: color-based information representative of data processing equipment type for an associated data processing component, color based information representative of a developmental status of the associated data processing component, a component name of the associated data processing component, a description of the associated data processing component, structure information for the associated data processing component, and information regarding the use for the associated data processing component.

20. The non-transitory computer-readable medium of claim 15, wherein at least one of the plurality of subsystems is lower in the hierarchy than another of the plurality of subsystems, and wherein the block corresponding to the subsystem lower in the hierarchy is located closer to an origin of the other axis than the block corresponding to the other subsystem higher in the hierarchy.

\* \* \* \* \*